United States Patent
Li et al.

(10) Patent No.: US 11,317,319 B2
(45) Date of Patent: Apr. 26, 2022

(54) METHOD AND DEVICE FOR CONTROLLING CONGESTION

(71) Applicant: Samsung Electronics Co., Ltd., Gyeonggi-do (KR)

(72) Inventors: Yingyang Li, Beijing (CN); Shichang Zhang, Beijing (CN); Yi Wang, Beijing (CN)

(73) Assignee: Samsung Electronics Co., Ltd

( * ) Notice: Subject to any disclaimer, the term of this patent is extended or adjusted under 35 U.S.C. 154(b) by 25 days.

(21) Appl. No.: 16/335,944

(22) PCT Filed: Sep. 27, 2017

(86) PCT No.: PCT/KR2017/010685
§ 371 (c)(1),
(2) Date: Mar. 22, 2019

(87) PCT Pub. No.: WO2018/062832
PCT Pub. Date: Apr. 5, 2018

(65) Prior Publication Data
US 2019/0313279 A1    Oct. 10, 2019

(30) Foreign Application Priority Data

Sep. 29, 2016   (CN) .......................... 201610867003.4
Nov. 1, 2016    (CN) .......................... 201610942886.0
(Continued)

(51) Int. Cl.
*H04W 28/02*     (2009.01)
*H04L 12/923*    (2013.01)
*H04W 72/12*     (2009.01)
*H04L 47/762*    (2022.01)

(52) U.S. Cl.
CPC ....... *H04W 28/0289* (2013.01); *H04L 47/762* (2013.01); *H04W 28/0284* (2013.01); *H04W 72/12* (2013.01); *H04W 72/1242* (2013.01)

(58) Field of Classification Search
CPC ............. H04W 72/12; H04W 28/0289; H04W 28/0236; H04W 72/1242; H04L 47/762
See application file for complete search history.

(56) References Cited

U.S. PATENT DOCUMENTS 7,013,271 B2    3/2006  Nayak
2006/0245356 A1  11/2006  Porat et al.
(Continued)

FOREIGN PATENT DOCUMENTS

CN          1539138       10/2004
WO    WO 2015/026140      2/2015

OTHER PUBLICATIONS

Ericsson, "Congestion Control in V2V", R2-165516, 3GPP TSG-RAN WG2 #95, Aug. 22-26, 2016, 3 pages.
(Continued)

*Primary Examiner* — Omer S Mian
(74) *Attorney, Agent, or Firm* — The Farrell Law Firm, P.C.

(57) ABSTRACT

The present disclosure relates to a communication method and system for converging a 5th-Generation (5G) communication system for supporting higher data rates beyond a 4th-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. The present disclosure provides a method for controlling congestion, including: a User Equipment (UE) measures a Channel Busy Ratio (CBR), and controls congestion based on the CBR and a priority; the UE transmits Scheduling Assignment (SA) indicating data channel resources, and correspondingly transmits data.

16 Claims, 9 Drawing Sheets

|                | CBR interval 1 | CBR interval 2 | CBR threshold |
|----------------|---------------|---------------|---------------|
| PPPP interval A | A1 group of transmission parameters | A2 group of transmission parameters | PPPP 1 : CBR threshold 1 |
|                |               |               | PPPP 2 : CBR threshold 2 |
|                |               |               | PPPP 3 : CBR threshold 3 |
| PPPP interval B | B1 group of transmission parameters | B2 group of transmission parameters | PPPP 4 : CBR threshold 4 |
|                |               |               | PPPP 5 : CBR threshold 5 |
|                |               |               | PPPP 6 : CBR threshold 6 |
|                |               |               | PPPP 7 : CBR threshold 7 |
|                |               |               | PPPP 8 : CBR threshold 8 |

(30) Foreign Application Priority Data

| Nov. 15, 2016 | (CN) | .......................... 201611005937.3 |
| Dec. 1, 2016 | (CN) | .......................... 201611089187.2 |
| Feb. 6, 2017 | (CN) | .......................... 201710066053.7 |
| Feb. 15, 2017 | (CN) | .......................... 201710081782.X |

(56) References Cited

U.S. PATENT DOCUMENTS

| 2016/0205584 A1 | 7/2016 | Baek et al. | |
| 2019/0116475 A1* | 4/2019 | Lee ........................ | H04W 72/02 |
| 2019/0150157 A1* | 5/2019 | Panteleev ............. | H04W 76/14 |
| | | | 370/329 |
| 2019/0182840 A1* | 6/2019 | Feng ........................ | H04W 4/44 |
| 2020/0044971 A1* | 2/2020 | Gulati ................... | H04W 24/06 |

OTHER PUBLICATIONS

Nokia, Alcatel-Lucent Shanghai Bell, "On Congestion Control for V2V Communication", R1-167802, 3GPP TSG RAN WG1 Meeting #86, Aug. 22-26, 2016, 2 pages.

European Search Report dated Jun. 18, 2019 issued in counterpart application No. 17856718.6-1215, 14 pages.

PCT/ISA/210 Search Report issued on PCT/KR2017/010685 (pp. 4).

PCT/ISA/237 Written Opinion issued on PCT/KR2017/010685 (pp. 9).

Huawei, HiSilicon, 3GPP TSG RAN WG1 Meeting #86, R1-166166, Gothenburg, Sweden, Aug. 12, 2016, Congestion control for V2V, pp. 6.

Catt, 3GPP TSG RAN WG1 Meeting #83, R1-157449, Anaheim, USA, Nov. 13, 2015, Further discussion on resource allocation mechanism in PC5-based V2V, pp. 12.

Qualcomm Incorporated, 3GPP TSG-RAN WG1 #86, R1-166259, Gothenburg, Sweden, Aug. 13, 2016, Measurement metric for congestion control, pp. 11.

Qualcomm Incorporated, 3GPP TSG-RAN WG1 #86, R1-166257, Gothenburg, Sweden, Aug. 13, 2016, Details of sensing using autonomous resource selection for V2V, pp. 13.

Intel Corporation, 3GPP TSG RAN WG1 #86, R1-166511, Gothenburg, Sweden, Aug. 13, 2016, Sidelink measurements for V2V sensing and resource re-selection procedures, pp. 7.

Chinese Office Action dated Dec. 2, 2021 issued in counterpart application No. 201710081782.X, 26 pages.

* cited by examiner

[Fig. 1]
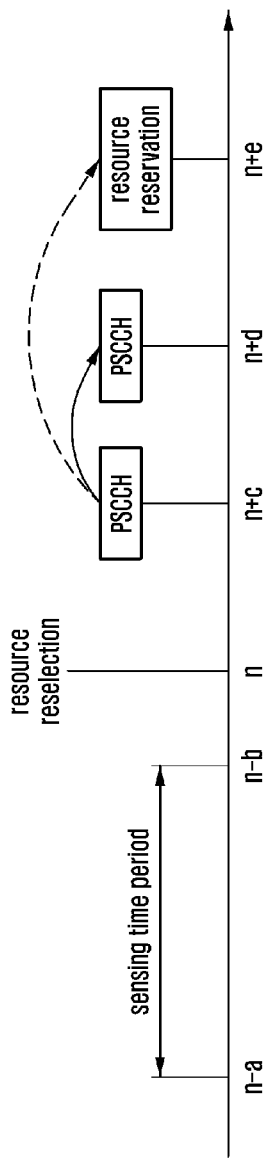
[Fig. 2]
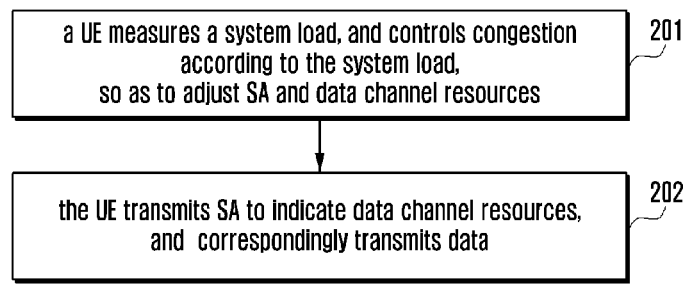

[Fig. 3]

|  | CBR interval 1 | CBR interval 2 | CBR threshold |
|---|---|---|---|
| PPPP interval A | A1 group of transmission parameters | A2 group of transmission parameters | PPPP 1 : CBR threshold 1 |
|  |  |  | PPPP 2 : CBR threshold 2 |
|  |  |  | PPPP 3 : CBR threshold 3 |
| PPPP interval B | B1 group of transmission parameters | B2 group of transmission parameters | PPPP 4 : CBR threshold 4 |
|  |  |  | PPPP 5 : CBR threshold 5 |
|  |  |  | PPPP 6 : CBR threshold 6 |
|  |  |  | PPPP 7 : CBR threshold 7 |
|  |  |  | PPPP 8 : CBR threshold 8 |

[Fig. 4]

|  | CBR interval 1 | CBR interval 2 | CBR threshold |
|---|---|---|---|
| PPPP interval A | a first group of transmission parameters | A2 group of transmission parameters | PPPP 1 : CBR threshold 1 |
|  |  |  | PPPP 2 : CBR threshold 2 |
|  |  |  | PPPP 3 : CBR threshold 3 |
| PPPP interval B |  | B2 group of transmission parameters | PPPP 4 : CBR threshold 4 |
|  |  |  | PPPP 5 : CBR threshold 5 |
|  |  |  | PPPP 6 : CBR threshold 6 |
|  |  |  | PPPP 7 : CBR threshold 7 |
|  |  |  | PPPP 8 : CBR threshold 8 |

[Fig. 5]

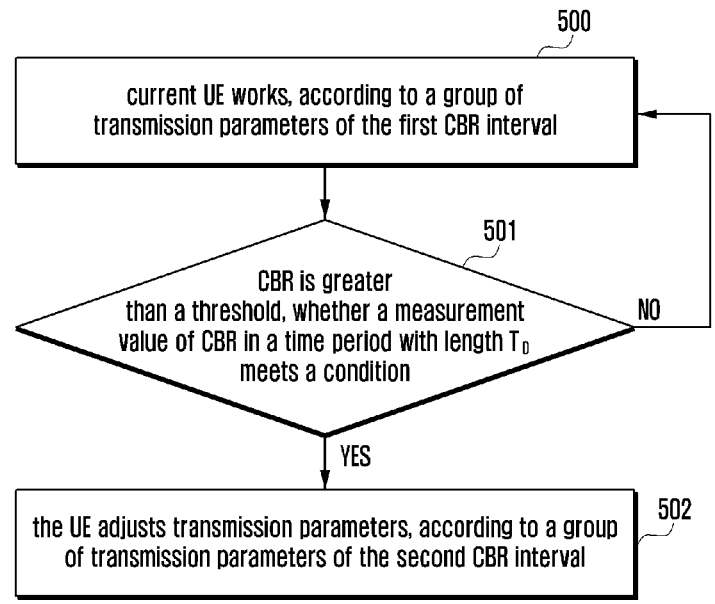

[Fig. 6]
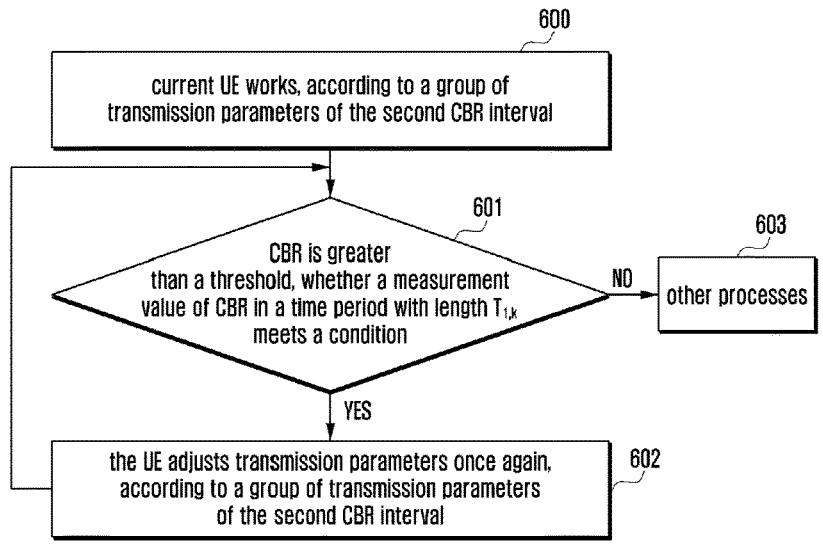
[Fig. 7]
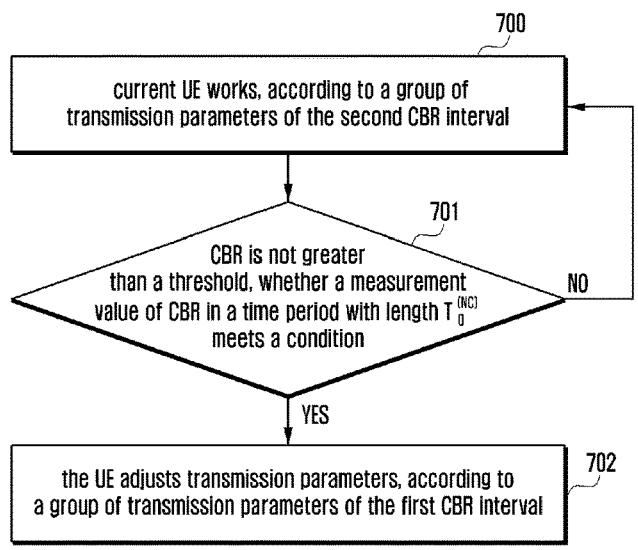
[Fig. 8]
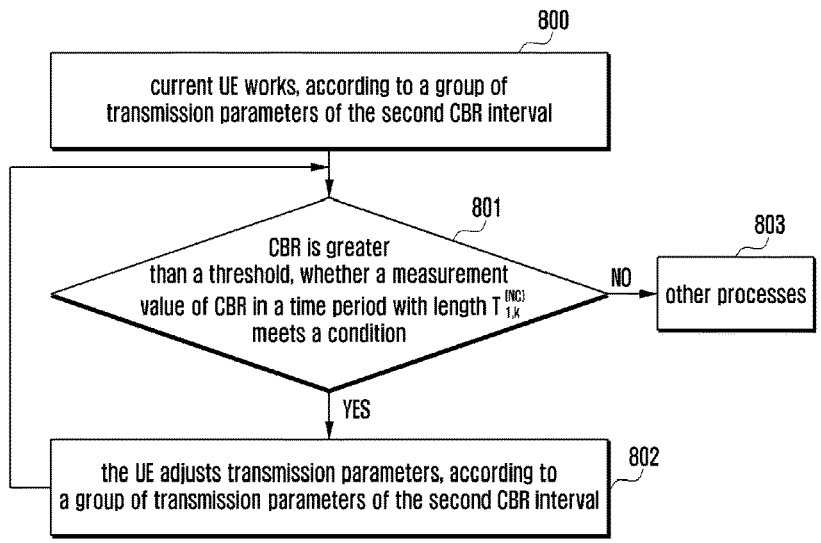

[Fig. 9]
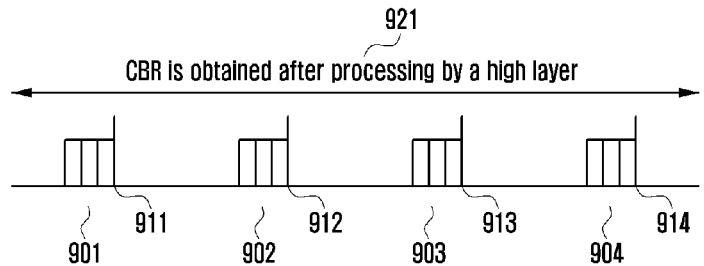
[Fig. 10]
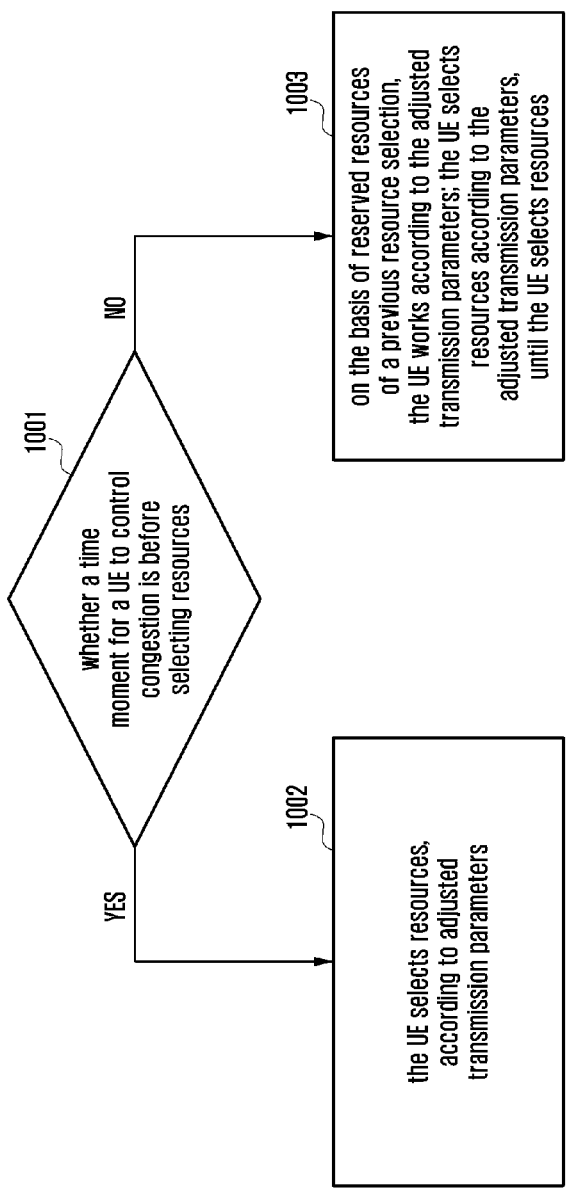

[Fig. 11]
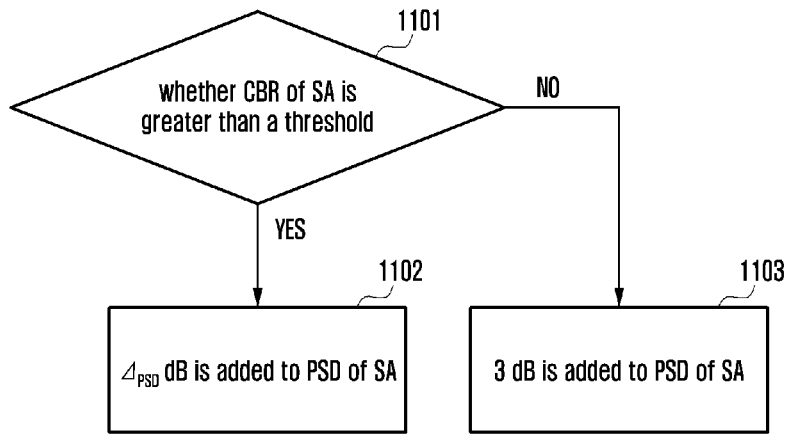
[Fig. 12]
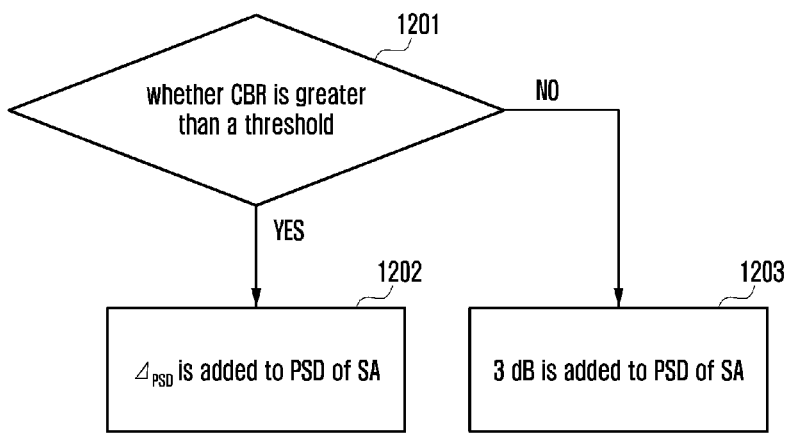
[Fig. 13]
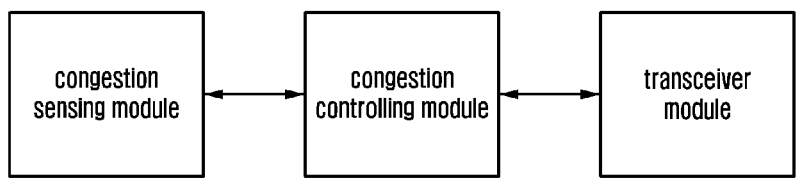

[Fig. 14]
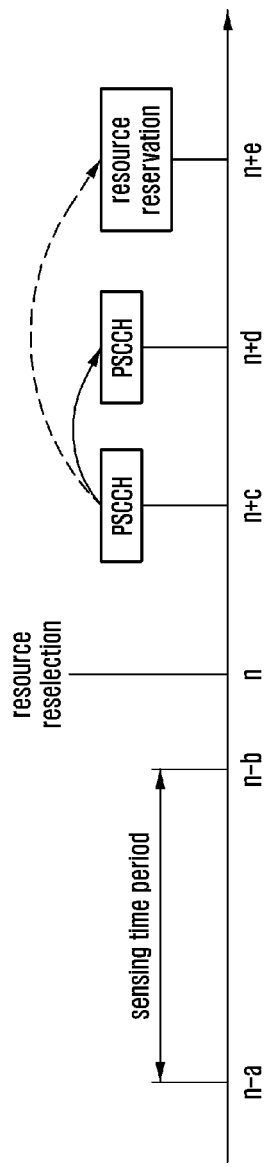

[Fig. 15]
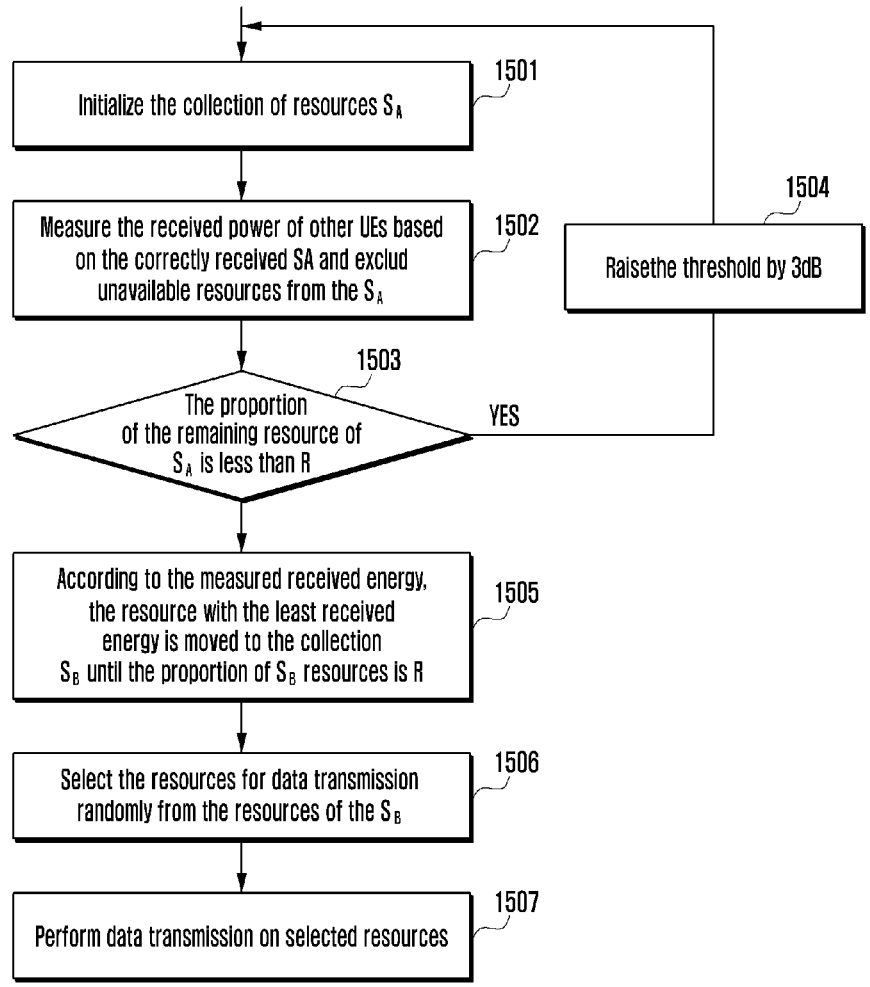
[Fig. 16]
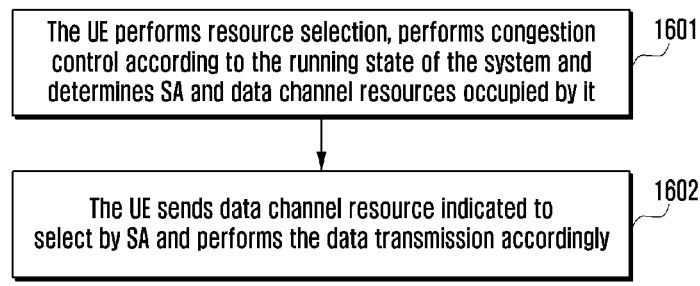

[Fig. 17]
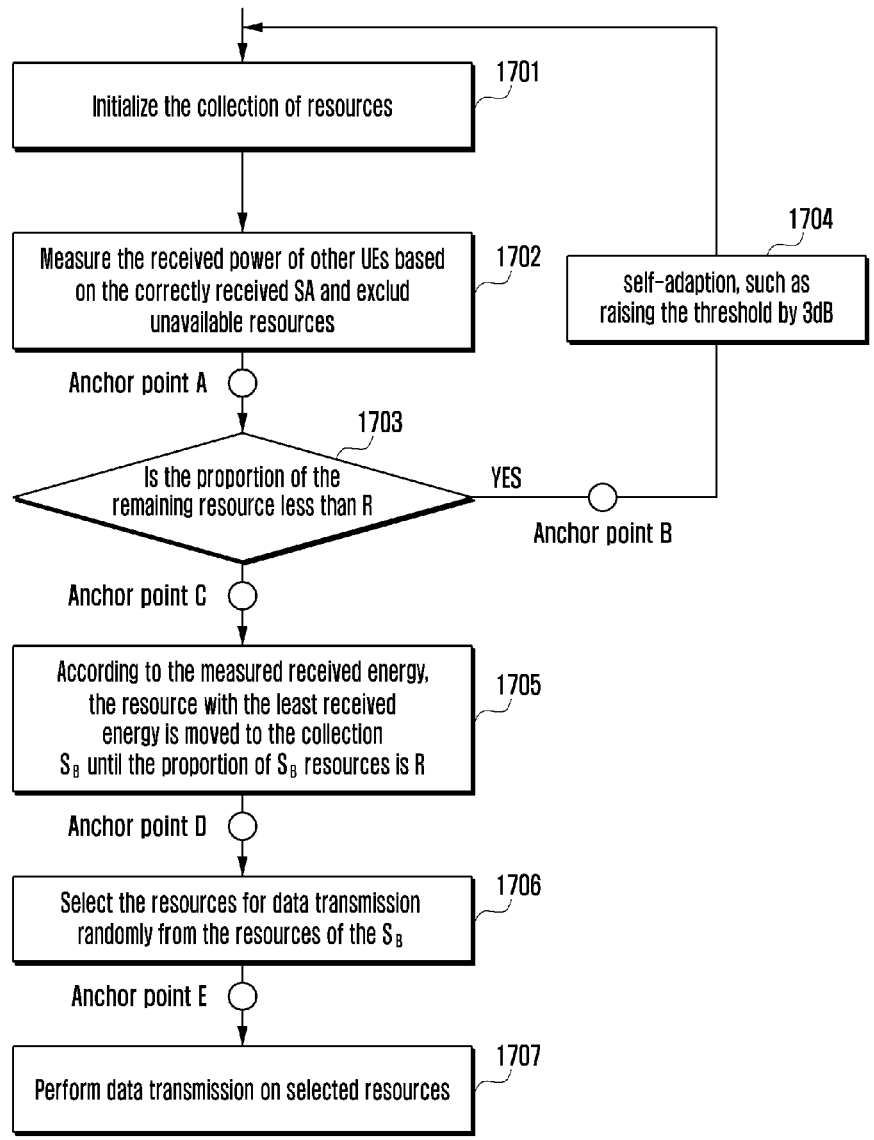
[Fig. 18]
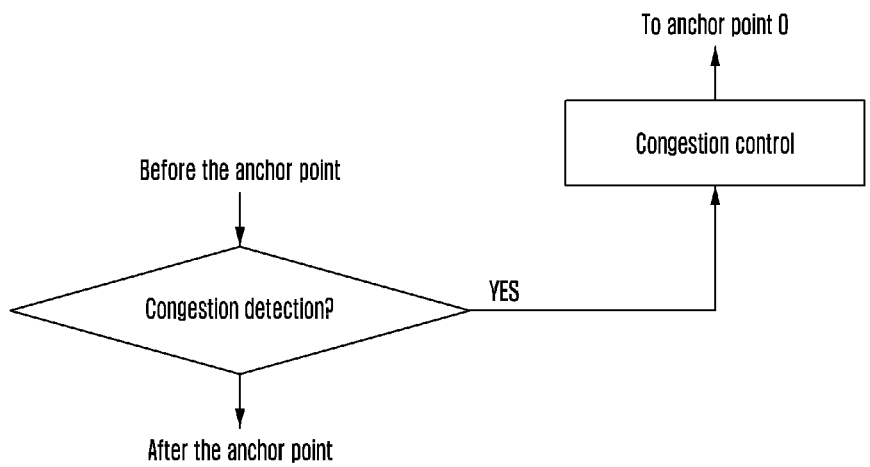

[Fig. 19]
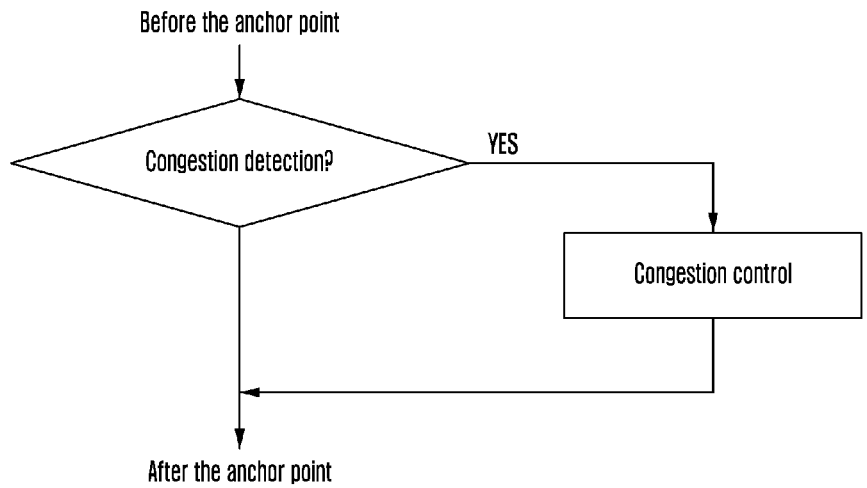
[Fig. 20]
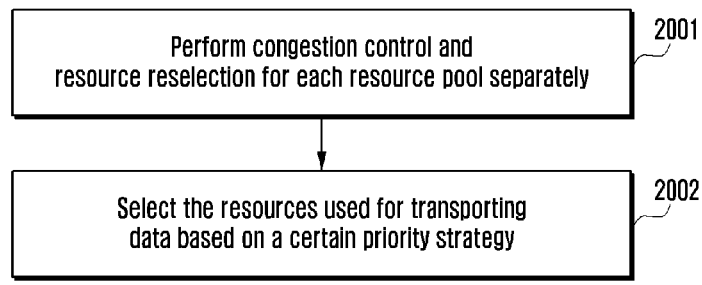
[Fig. 21]
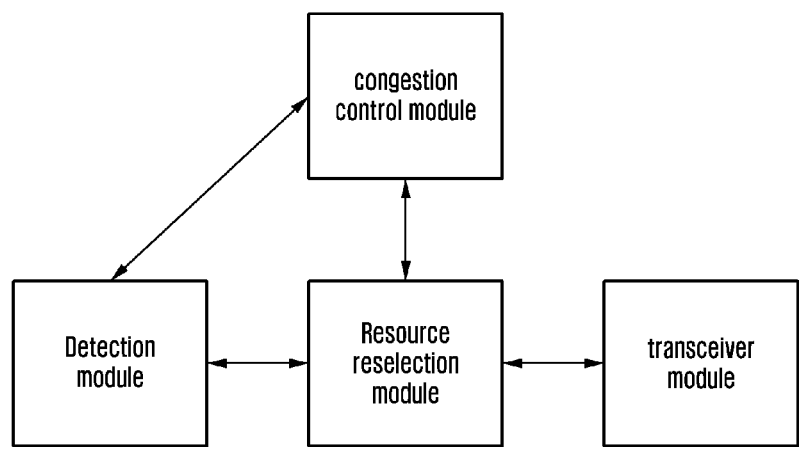

METHOD AND DEVICE FOR CONTROLLING CONGESTION

PRIORITY

This application is a National Phase Entry of PCT International Application No. PCT/KR2017/010685 which was filed on Sep. 27, 2017, and claims priority to Chinese Patent Application Nos. 201610867003.4, 201610942886.0, 201611005937.3, 201611089187.2, 201710066053.7 and 201710081782.X, which were filed on Sep. 29, 2016, Nov. 1, 2016, Nov. 15, 2016, Dec. 1, 2016, Feb. 6, 2017 and Feb. 15, 2017, respectively, the content of each of which is incorporated herein by reference.

TECHNICAL FIELD

The present disclosure relates to wireless communication system technologies, and more particularly, to a method and a device for controlling congestion in a vehicle to everything (V2X) system, and to a method and a device of a resource reselection and a congestion control in a V2X system.

BACKGROUND ART

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Co-ordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access(NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

Device to Device (D2D) communication technologies have been accepted by third generation partnership project (3GPP) standards, due to huge potential value thereof in public safety field and ordinary civil communication field. Since 3GPP D2D communications mainly aim at low speed terminals, and V2X services with lower requirements of delay sensitivity and reception reliability, D2D functions already achieved are far from meeting users' requirements. In each subsequent 3GPP version, it is a wide consensus to further enhance the D2D functional framework, which is achieved by each communication terminal manufacture and communication network equipment manufacture at present. Based on current D2D broadcast communication mechanism, Vehicle to Vehicle/Perdestrian/Infrastructure/Network (V2X), which supports a direct low-delay communication with higher-reliability between high-speed devices, between a high-speed device and a low-speed device, between a high-speed device and a stationary device, is one function needing to be standardized firstly.

There may be two structures in a V2X system, which are configured with a Physical Sidelink Control Channel (PSCCH) resource pool and a Physical Sidelink Share Channel (PSSCH) resource pool. A PSCCH and a PSSCH, which is scheduled by the PSCCH, may be located within the same subframe. Alternatively, a PSCCH and any PSSCH, which is scheduled by the PSCCH, may be not located within the same subframe. A PSCCH resource pool and a PSSCH resource pool are respectively a set, which occupies the same subframe. One PSCCH is mapped to 2 Physical Resource Blocks (PRBs) fixedly. An allocation granularity of frequency resources is a sub-channel. One sub-channale includes consecutive PRBs. The number of PRBs of a subchannel is configured by high-layer signaling. Resources of a device may be one or more occupied consecutive sub-channels. When PSCCH and PSSCH are located within the same subframe, the PSCCH and PSSCH may occupy consecutive PRBs. Among one or more consecutive subchannels occupied by resources of a device, two PRBs, e.g., two PRBs with the lowest frequency are configured to bear the PSCCH, while the remaining PRBs are configured to bear the PSSCH. The number of PRBs actually occupied by the PSSCH should be power of 2, 3 and 5. When the PSCCH and PSSCH are located within the same subframe, PRB of the PSCCH and PRB of the PSSCH may be not consecutive. At this time, initial PRB positions of the PSCCH resource pool and PSSCH resource pool may be respectively configured. The PSSCH resource pool still takes a sub-channel as a granularity to allocate resources. For a device, an index of PSCCH occupied by the device is equal to the minimum index of a sub-channel of PSSCH, which is occupied by the device.

In the V2X system, above problems of collision and in-band leakage may be solved with sensing. A basic assumption here is as follows. Resource occupation of a device is Semi-Persistent Scheduling (SPS). That is, resources occupied by a device are periodic within a time period. As shown in FIG. 1, denote that a moment for selecting a PSCCH/PSSCH resource by a device is subframe n. The device firstly senses resources in the resource pool thereof within a time period from subframe (n−a) to subframe (n−b), and determines which time-frequency resources are occupied and which time-frequency resources are idle. And then, the device selects the PSCCH/PSSCH resource in subframe n. Denote that the PSCCH is transmitted in subframe (n+c), the PSSCH is transmitted in subframe (n+d), and reserved resource is in subframe (n+e). Subsequently, the PSCCH is transmitted in subframe (n+c), the PSSCH is transmitted in subframe (n+d), and next data is transmitted in the reserved resource (n+e). More particularly, when c=d, the PSCCH and the PSSCH are located within the same subframe. An interval between subframe (n+e) and subframe (n+d) is equal to a reserved interval I. The reserved interval I is equal to $P_{step} \cdot k$. For example, $P_{step}=100$. That is, a delay not longer than 100 ms is supported. In the foregoing formula, k may be an integer from 1 to 10, and k may be less than 1, e.g. ⅕, ½. The value range of k may be configured by a high layer. When selecting resources, the device may select K resources, which are respectively located within different subframes. That is, each data may be transmitted repeatedly K times, in which K is greater than or equal to 1, e.g., K=2, thereby avoiding that some devices cannot receive such data due to limitations of a half-duplex operation. When K is greater than 1, each PSSCH may indicate all of foregoing K resources. A device may adopt two methods to sense resources within a resource pool thereof. A first method is to obtain accurate information of a channel occupied by another device, on the basis of decoding of the PSCCH, so as to measure reception power of a corresponding device, and determine resource occupation, and/or, resource reservation based on foregoing reception power and reserved interval in PSCCH. The second method is to determine resource occupation, and/or, resource reservation, based on received energy. For a resource in subframe x within a selected window, foregoing received energy refers to an average value of energy, which is received on the same sub-channel resource of subframe $(x-P_{step} \cdot j)$ within a sensing window. According to the above two methods, a device may avoid transmitting on the same resource occupied by another device as much as possible.

In actual communications, in a possible scene with heavy load, a resource re-selection algorithm needs to reduce values of some indicators, and continuously complete communication functions, that is, congestion control. How to effectively support congestion control is a problem urgently to be solved.

Device to device (D2D) communication technology has been accepted by 3GPP standards because of its great potential value in the public safety field and the general civilian communication field. And some functions of D2D has been standardized in 3GPP Rel-12, which includes a mutual discovery of D2D terminals in the scenario of In Coverage (IC) and broadcast communications between D2D terminals in the scenarios of IC, Partial Coverage (PC) and Out of Coverage (OC).

The 3GPP Rel-12 standards define two modes of D2D broadcast communications, which are referred to as Mode 1 and Mode 2. Wherein, Mode 1 requires the UE sending the D2D broadcast communication must be a UE In Coverage, hereinafter, referred to as ICUE. The UE obtain configuration information of a resource pool of a Physical Sidelink Control CHannel (PSCCH) of Mode 1 through receiving a system broadcast signal sent by an eNB. Wherein, the configuration information includes cycles of the PSCCH, the position of a subframe used for sending the PSCCH in each cycle, and the position of Physical Resource Block (PRB) used for sending the PSCCH in each subframe. When a UE supporting the broadcast communication of Mode 1 has data to transmit, the UE applies for special communication resources of Mode 1 from the eNB through a specific Buffer Status Report (BSR). Then the UE detects the Sidelink Grant from the eNB before each PSCCH cycle, and obtains the position of resources used to send PSCCH and Physical Sidelink Shared Channel (PSSCH) in the PSCCH cycle. In Mode 1, by a centralized control of the eNB, resources conflicts between different UEs may be avoided.

The UE transmitting D2D broadcast communications through Mode 2 may be either an ICUE or a UE Out of Coverage, hereinafter, referred to as OCUE. The ICUE obtains the PSCCH resource pool of Mode 2 and the associated configuration of the PSSCH resource pool by receiving system broadcast signaling from the eNB. Wherein, the PSSCH resource pool includes the position of subframes used for transmitting the PSSCH in the associated PSCCH cycle, and the position of PRBs used for transmitting the PSSCH in each subframe. In each PSCCH cycle, the ICUE randomly selects the resources for transmitting the PSCCH and the associated PSSCH. The OCUE determines the configuration information of PSCCH resource pool and that of the associated PSSCH resources pool of Mode 2 through pre-configuring information. The way of the resource selection of the OCUE is the same as that of the ICUE. In the PC scenario, the resource pool configuration of Mode 2 pre-configured by OCUE is related to the carrier frequency, the system bandwidth, and/or the TDD configuration of the cell where the ICUE participating D2D broadcast communication is located.

Because the D2D communication of 3GPP is mainly for low-speed terminal and V2X business which has a lower requirement on time-delay and receiving reliability, the D2D functions implemented may not meet the needs of users. In the subsequent 3GPP versions, to enhance the functional framework of D2D is a broad consensus among communication terminal manufacturers and communication network apparatus manufacturers. Wherein, based on the D2D broadcast communication mechanism, low time delay and high reliability communications between two high speed devices, between a low speed device and a high speed device, between a high speed device and a static device should be supported. That is, V2X (Vehicle to Vehicle/Pedestrian/Infrastructure/Network) is one of the functions that need to be standardized first.

In V2X systems, two structures may be used to configure the PSCCH resource pool and the PSSCH resource pool. The PSCCH may be located in the same subframe as one of the PSSCH scheduled by the PSCCH. Or, the PSCCH should not locate in the same subframe as any one of the PSSCH scheduled by the PSCCH. The PSCCH resource pool and the PSSCH resource pool occupies the same collection of subframes A PSCCH is mapped to 2 PRBs fixedly. The allocation granularity of frequency resources is a sub-channel, which contains continuous PRBs. And the number of PRBs of a sub-channel is configured by a high-layer signaling. The resources occupied by a device may include one or more continuous sub-channels. When PSCCH and PSSCH are located in the same subframe, the PSCCH and the PSSCH may occupy continuous PRBs. In the one or more continuous sub-channels occupied by a device, two PRBs, for example, two PRBs with the lowest frequency are used to carry the PSCCH and other PRBs are used to carry the PSSCH. The actual number of PRBs occupied by the PSSCH also needs to be the power of 2, 3 and 5. When the PSCCH and PSSCH are located at the same subframe, the PRBs of the PSCCH and the PRBs of the PSSCH may also be discontinuous. At this point, the location of an initial PRB of the PSCCH resource pool and that of the PSSCH resource pool may be configured respectively. The PSSCH resource pool still allocates resources taking a sub-channel as the allocation granularity. For a device, the index of the PSCCH occupied by the device equals to the minimum among indexes of sub-channels of the PSSCH occupied by the device.

In V2X systems, collision problems and leak in band problems may be solved based on sensing. A basic assumption here is that the occupancy resources of a device is semi persistent scheduling (SPS), that is, the resources occupied by the device are periodic over a period of time. As shown in FIG. 14, the time of selecting PSCCH/PSSCH resources by the device is recorded as subframe n, the device should detect resources in the resource pool in the period of time from subframe n–a to subframe n–b firstly to determine which time-frequency resources are occupied and which time-frequency resources are idle. And then the device may select PSCCH/PSSCH resources in subframe n. If the PSCCH is transmitted in subframe n+c, the PSSCH is transmitted in subframe n+d, and resources reserved is in subframe n+e, the device may transmit the PSCCH in subframe n+c, transmit the PSSCH in subframe n+d, and transmit subsequent data on the resources reserved in subframe n+e. In particular, when c equals to d, the PSCCH and the PSSCH are located in the same subframe. In the implementation of the resource reselection, the device may select K resources in different subframes, that is, a group of data may be transmitted K times, wherein K is greater than or equal to 1, for example, K equals to 2, so as to avoid the problem that some devices may not receive the group of data because of the restrictions of this half duplex operation. When K is greater than 1, each PSSCH may indicate all the K resources above. A device may detect the resources in the resource pool in two ways. One is obtaining accurate information of channels occupied by other devices based on decoding of the PSCCH. And the received power of the other devices may be measured accordingly. The other way is based on sensing the received energy of a resource of the PSSCH resource pool. By combining the two methods above, the device may avoid to occupy the same resources with other devices to transmit data as much as possible.

FIG. 15 is a schematic diagram illustrating a resource reselection procedure based on sensing. It is assumed that the resource reselection is performed in subframe n, the reserved interval of the current reserved resources of the device is $P_A$, and the number of cycles of the reserved resource required is C. The device may select resources in a selection window $[n+T_1, n+T_2]$ and reserve C cycles with the interval $P_A$. $T_1$ and $T_2$ are set relying on the implementations of the UE, for example, $T_1 \leq 4$, $20 \leq T_2 \leq 100$. $T_1$ depends on the processing delay from selecting resource to starting transmitting the scheduling assignment (SA) signaling and data. $T_2$ mainly depends on the delay characteristics that can be tolerated by current traffic. First, set all the resources within the selection window to be in the collection $S_A$ (1501). Next, based on the SA correctly received, assuming that the SA indicates that the resources are continuously reserved after subframe n, measure the received power of data channel scheduled by the SA. And when the received power exceeds a corresponding threshold, a part of candidate resources of $S_A$ is removed (1502).

Specifically, when the received power exceeds the corresponding threshold, according to the SA that the reserved resource Y subsequent to subframe n is not available, the threshold is determined jointly according to the priority of the device performing the resource reselection and the priority indicated by the SA correctly received. Assuming that $R_{x,y}$ is a monadic subframe resource in the selection window $[n+T_1, n+T_2]$, $R_{x,y}$ is located in the subframe y and contains one or more consecutive sub-channels starting from the subchannel x, when the PRBs of $R_{x,y+jP_A}$ and the PRBs of resource Y is overlapped, $R_{x,y}$ is not available for device A, that is, $R_{x,y}$ is excluded from the collection $S_A$, j=0, 1, . . . , C−1, wherein, C is the number of cycles of reserved resource in accordance with cycle $P_A$ in the current needs of device A.

Next, whether the proportion of the remaining resources to the total resources reaches a proportion R, such as 20%, is determined (1503). If the proportion is less than $R_{x,y}$ the threshold is raised by 3 dB (1504) and step 1501 performed again. Otherwise, subsequent step 1505 is performed. In step 1505, the received energy on the remaining resources is estimated, and the resource with the minimum received energy is moved to a collection $S_B$, until the proportion of the resources of $S_B$ reaches R. As for a group of resources containing multiple sub-channels, the received energy of this group of resources is the average value of the receive energy on every sub-channel of the resource. Next, the resources used for data transmission are selected from the resource of $S_B$ (1506) and the selected resources are used for data transmission (1507).

DISCLOSURE OF INVENTION

Technical Problem

In actual communication, a possible scenario is a heavy load scenario. In this case, the resource reselection algorithm needs to be able to run in the heavy load case to complete the communication function, namely, to perform the congestion control by reducing some quota. Therefore, how to effectively support a congestion control is an urgent problem to be solved.

Solution to Problem

The present disclosure provides a congestion control method and device, which provide a mechanism for finding and controlling congestion, thereby better avoiding collision and interference among devices.

To achieve foregoing objectives, the present disclosure adopts the following technical solutions.

A method for controlling congestion, including:
measuring, by a User Equipment (UE), a Channel Busy Ratio (CBR), controlling congestion based on the CBR and a priority, so as to adjust a Scheduling Assignment (SA) and data channel resources;
transmitting, by the UE, the SA indicating the data channel resources, and correspondingly transmitting data.

Preferably, controlling congestion based on the CBR and the priority includes:

dividing multiple CBR intervals for each priority, wherein a group of transmission parameters are respectively configured, or pre-configured for each CBR interval of a priority;

configuring one or more CBR thresholds for each priority, and dividing a CBR interval correspondingly, for a priority, when a measured CBR is located within a certain CBR interval of the priority, working for the priority, by the UE, according to a group of transmission parameters of such CBR interval.

Preferably, controlling congestion based on the CBR and the priority includes:

dividing each priority interval into multiple CBR intervals, in which a group of transmission parameters are respectively configured, or pre-configured for each CBR interval of a priority interval;

configuring one or more CBR thresholds for each priority interval, dividing a CBR interval correspondingly, for a priority, when a measured CBR is located within a certain CBR interval of a priority interval, where the priority is located, working by the UE for the priority, according to a group of transmission parameters of the CBR interval; or, configuring one or more CBR thresholds for each priority, dividing a CBR interval correspondingly, for a priority, when a measured CBR is located within a certain CBR interval of the priority, working by the UE for the priority, according to a group of transmission parameters of the same CBR interval of a priority interval, where the priority is located.

Preferably, controlling congestion based on the CBR and the priority includes:

dividing a CBR interval, which is applicable for all the priorities;

configuring or pre-configuring a group of transmission parameters for each CBR interval, wherein the group of transmission parameters are applicable for all the priorities;

configuring one or more CBR thresholds for each priority interval, dividing a CBR interval correspondingly, for a priority, when a measured CBR is located within a certain CBR interval of a priority interval, where the priority is located, working by the UE, according to a group of transmission parameters corresponding to the CBR interval; or, configuring one or more CBR thresholds for each priority, and dividing a CBR interval correspondingly, for a priority, when a measured CBR is located with a certain CBR interval of the priority, working by the UE, according to a group of transmission parameters corresponding to the CBR interval.

Preferably, for each priority or each priority interval, the first CBR interval adopts the same group of transmission parameters.

Preferably, the first CBR interval does not support a packet dropping operation; or, for a CBR interval, when a calculated Channel Occupation Ratio (CR) is greater than the maximum value CRlimit of the CR, data dropping is supported; or, for a CBR interval, data of a priority within a priority interval is discarded; or, for a CBR interval, when size of a data packet exceeds a certain threshold, data is discarded.

Preferably, the method further includes:

for a priority or a priority interval, assume that current UE works according to a group of transmission parameters of the n1$^{th}$ CBR interval, when sensing that the CBR is greater than a threshold, adjusting, by the UE, the transmission parameters, based on a group of transmission parameters of the n2$^{th}$ CBR interval, n1<n2; or, when a measurement value of the CBR in a time period with length $T_0$ meets a predetermined condition, adjusting, by the UE, the transmission parameters, based on a group of transmission parameters of the n2$^{th}$ CBR interval.

Preferably, the predetermined condition met by the measurement value of the CBR in the time period with length $T_0$ includes at least one of:

all the measurement values of the CBR in the time period with length $T_0$ belong to the n2$^{th}$ CBR interval;

a ratio that a measurement value of the CBR in the time period with length $T_0$ belongs to the n2$^{th}$ CBR interval exceeds a certain ratio;

a measurement value of the CBR at the end of the time period with length $T_0$ belongs to the n2$^{th}$ CBR interval.

Preferably, the method further includes:

for a priority or a priority interval, assume that current UE works according to a group of transmission parameters of the n2$^{th}$ CBR interval, when a measurement value of the CBR in a time period with length $T_0^{(NC)}$ meets a predetermined condition, adjusting, by the UE, the transmission parameters, according to a group of transmission parameters of the n1$^{th}$ CBR interval, n1<n2, wherein the predetermined condition met by the measurement value of the CBR in the time period with length $T_0^{(NC)}$ includes at least one of:

all the measurement values of the CBR in the time period with length $T_0^{(NC)}$ belong to the n1$^{th}$ CBR interval;

a ratio that a measurement value of the CBR in the time period with length $T_0^{(NC)}$ belongs to the n1$^{th}$ CBR interval exceeds a certain ratio;

a measurement value of the CBR at the end of the time period with length $T_0^{(NC)}$ belongs to the n1$^{th}$ CBR interval.

Preferably, the method further includes:

for a priority or a priority interval, assume that current UE works according to a group of transmission parameters of the n2$^{th}$ CBR interval, when a measurement value of the CBR in a time period with length $T_{1,k}^{(NC)}$ meets a predetermined condition, adjusting, by the UE, the transmission parameters, according to a group of transmission parameters of the n2$^{th}$ CBR interval;

wherein the predetermined condition met by the measurement value of the CBR in the time period with length $T_{1,k}^{(NC)}$ includes at least one of:

all the measurement values of the CBR in the time period with length $T_{1,k}^{(NC)}$ belong to the n1$^{th}$ CBR interval;

a ratio that a measurement value of the CBR in the time period with length $T_{1,k}^{(NC)}$ belongs to the n1$^{th}$ CBR interval exceeds a certain ratio; or, a measurement value of the CBR at the end of the time period with length $T_{1,k}^{(NC)}$ belongs to the n1$^{th}$ CBR interval.

Preferably, measuring the CBR by the UE includes:

measuring the CBR by the UE, before selecting resources; or, measuring the CBR by the UE before selecting resources, and measuring the CBR at some other timing positions, in addition to a timing position before selecting resources.

Preferably, measuring the CBR by the UE includes:

when the CBR measured by the UE is not greater than a third threshold, reducing a frequency of the CBR;

when the CBR measured by the UE is greater than the third threshold, increasing the frequency of the CBR.

Preferably, controlling congestion by the UE includes:

controlling congestion and adjusting the transmission parameters by the UE, before selecting resources, and selecting resources according to the adjusted transmission parameters; or, on the basis of timing for controlling congestion by the UE, when the transmission parameters have been adjusted before selecting resources, selecting resources according to the adjusted transmission parameters;

when the transmission parameters are adjusted at another timing position, working, by the UE, according to the newly adjusted transmission parameters on resources, which were reserved by a previous resource selection.

Preferably, controlling congestion by the UE includes:

when the CBR of the SA exceeds a CBR threshold corresponding to the SA, an increment of a Power Spectral Density (PSD) of the SA to a PSD of a data channel is $\Delta_{PSD}$<3 dB;

when the CBR of at least one of the SA and the data channel exceeds the corresponding CBR threshold, the increment of the PSD of the SA to the PSD of the data channel is $\Delta_{PSD}$<3 dB;

when the CBR measured by the UE exceeds the CBR threshold, the increment of the PSD of the SA to the PSD of the data channel is $\Delta_{PSD}$<3 dB.

Preferably, the group of transmission parameters include the maximum value CRlimit of CR, L is the number of subframes used to calculate CR, and the CR is calculated within the following subframe range;

wherein the subframe range is [n−L+1.n]; or, the subframe range is [n,n+L−1]; or, the subframe range is [n−$L_1$,n+$L_2$−1], $L_1$+$L_2$=L.

Preferably, the group of transmission parameters include the maximum value CRlimit of CR, and the CR is respectively configured or pre-configured for each transmission resource pool; or, the CR is respectively configured or pre-configured for each carrier used for a vehicle to everything (V2X) transmission; or, the CR is only applicable for a UE working in transmission mode 4; or, the CR simultaneously comprises resource occupancy of transmission modes 3 and 4.

Preferably, the group of transmission parameters include the maximum value CRlimit of CR, and the method further comprises:

after determining a group of transmission parameters according to a priority and a CBR interval, to which current measurement value of the CBR belongs, when selecting resources, determining, by the UE, reserved resources according to the group of transmission parameters, wherein assume that all of these reserved resources are used for the UE's transmission, the CR calculated at each moment within a time period of the reserved resources is less than, or equal to the CRlimit; or, determining, by the UE, the reserved resources, according to the group of transmission parameters, wherein assume that all of these reserved resources are used for the UE's transmission, the CR calculated at one or more moments within the time period of the reserved resources is greater than the CRlimit.

Preferably, the group of transmission parameters include the maximum value CRlimit of CR, the CR does not differentiate priorities of data, and is jointly calculated for all the data transmissions of the UE, and the CRlimit is the permitted maximum value of the CR; or, the CR is respectively calculated for a different data priority, and the CRlimit, which is in a group of transmission parameters corresponding to a CBR interval c and PPPP m, is the maximum value of CR of data with PPPP level m, which is transmitted by the UE; or, the CR is respectively calculated for a different data priority, and the CRlimit, which is in the group of transmission parameters corresponding to the CBR interval c and PPPP m, is the maximum ratio of the number of subchannels, which are configured to transmit data with PPPP value greater than or equal to m, to the total number of subchannels; or, the CR is respectively calculated for a different data priority, and the CRlimit, which is in the group of transmission parameters corresponding to the CBR interval c and PPPP m, is the maximum sum value of the CR of data, wherein the data is permitted to be transmitted by the UE and PPPP level of which is less than, or equal to m; or, the CR is jointly calculated for all the data transmissions of the UE within a priority range, and the CRlimit, which is in the group of transmission parameters corresponding to the CBR interval c and PPPP m, is the maximum value of the CR of data, which is permitted to be transmitted by the UE and PPPP level of which is less than, or equal to m.

A device for controlling congestion, including a congestion sensing module, a congestion controlling module, and a transceiver module, wherein the congestion sensing module is configured to measure a CBR;

the congestion controlling module is configured to control congestion according to the CBR and a priority, so as to adjust a SA and data channel resources; and, the transceiver module is configured to receive a SA and a data channel from another device, and transmit the SA and the data channel of the device, according to a selected channel resource.

By adopting the method in the present disclosure, a transmission parameter of a User Equipment (UE) is adjusted, based on a Channel Busy Ratio (CBR) and a priority, so as to reduce interferences among UEs as much as possible, and improve transmission performance of the UE.

The present application provides a method and a device for congestion control, providing mechanisms for detecting and controlling congestion, thereby collisions and interferences between devices are avoided.

In order to achieve the purposes above, the following technical scheme is adopted in the present application.

A method for congestion control includes:

detecting, by a user equipment, UE, a scheduling assignment SA signaling from another device;

measuring, by the UE, a received power of the another device and a received energy on each subchannel of each subframe in a resource pool;

performing, by the UE, a resource reselection according to the received power of the second UE and the received energy to determine resources of a Scheduling Assignment SA signaling and data channels occupied by the UE;

performing, by the UE, a congestion control according to a running state of a system; and transmitting, by the UE, the SA on the resources of the SA and data on the resources of the data channel; wherein, the SA is used to indicate the resources of the data channel selected by the UE.

Preferably, a metric of congestion is B/(S·N); wherein, S is the number of subframes in a window, each subframe is divided into N resources, and the number of unavailable resources in the S subframes is B; wherein, the window is a period of time for detecting by the UE or a selection window after subframe n, and the subframe n is the subframe performing the resources reselection.

Preferably, the congestion control function is performed after the process of excluding resources according to the SA and the received power, and a metric of congestion is the proportion of the remaining resources of $S_A$, or, the metric of congestion is the times that the proportion of the remaining resources is less than the a threshold; wherein, $S_A$ is a collection of all resources within a selection window.

Preferably, the congestion control function is performed when the resources is excluded according to the SA and the received power and the proportion of remaining resources is less than R, and a metric of congestion is the proportion of the remaining resources of $S_A$, or, the metric of congestion is the times that the proportion of remaining resources of $S_A$ is less than R, or, the metric of congestion is the times that the proportion of remaining resources of $S_A$ is less than a threshold, wherein, $S_A$ is a collection of all resources within a selection window.

Preferably, the congestion control function is performed when the resources is excluded according to the SA and the received power and the proportion of remaining resource is not less than R, and a metric of congestion is the proportion of the remaining resources of $S_A$, or, the metric of congestion is the times that the proportion of remaining resources of $S_A$ is less than a threshold.

Preferably, the congestion control function is performed after completing the resource reselection, and a metric of congestion is the times that the number of available resources is less than K after the resource reselection; wherein, K is the times of transmission of a group of data.

Preferably, the UE performs the resource reselection process again after a condition that triggers the congestion control is satisfied, or, the UE continues to perform the current resource reselection process after a condition that triggers the congestion control is satisfied.

Preferably, when performing the congestion control, according to a current priority adopted by the current data transmission, the UE only adjusts transmission parameters of data with the current priority; or the UE only adjusts transmission parameters of data with the current priority or with a priority less than the current priority; or the UE modifies transmission parameters of data with all priorities; or the UE only adjusts transmission parameters of data to be transmitted; or the UE adjusts transmission parameters of data with all possible priorities.

Preferably, the resource reselection includes:

performing, by the UE, the resource reselection on Np resource pools respectively, and selecting resources to be actually occupied according to a priority policy; or performing, by the UE, the process of excluding resources on Np resource pools separately based on the SA and received power, and performing the resource reselection according to the received energy taking the Np pools as a whole; or preforming, by the UE, the resource reselection taking Np resource pools as a whole;

wherein Np is the number of resource pools configured by the UE.

Preferably the process of configuring the resource pools comprises:

indicating a type of data that may be used by a resource pool when configuring the resource pool; and configuring a sharing relationship between the resource pools when configuring the resource pools.

A device for congestion control includes:

a detection module, a resource reselection module, a congestion control module and a transceiver module; wherein, the detection module is to detect a scheduling assignment, SA, signaling from another device and to measure a received power of the another device and the received energy on each subchannel of each subframe in a resource pool;

the resource reselection module is to perform a resource reselection according to the received power and the received energy of the another device to determine resources of the SA and data channels occupied;

the congestion control module is to perform a congestion control according to a running state of a system;

the transceiver module is to transmit the SA on the resources of the SA and to transmit data on the resources of the data channels; wherein, the SA is used to indicate the resources of the data channels selected.

By the method of the present disclosure, a system congestion state may be detected in time and the system may be adjusted to run in a stable state, thereby the transmission performance can be improved.

Advantageous Effects of Invention

By the method of the present disclosure, a system congestion state may be detected in time and the system may be adjusted to run in a stable state, thereby the transmission performance can be improved.

BRIEF DESCRIPTION OF DRAWINGS

FIG. 1 is a schematic diagram illustrating a sensing-based resource selection.

FIG. 2 is a flowchart in accordance with an embodiment of the present disclosure.

FIG. 3 is a schematic diagram illustrating a first method for configuring/pre-configuring transmission parameters in group, in accordance with an embodiment of the present disclosure.

FIG. 4 is a schematic diagram illustrating a second method for configuring/pre-configuring transmission parameters in group, in accordance with an embodiment of the present disclosure.

FIG. 5 is a first flowchart illustrating congestion control, in accordance with an embodiment of the present disclosure.

FIG. 6 is a second flowchart illustrating congestion control, in accordance with an embodiment of the present disclosure.

FIG. 7 is a third flowchart illustrating congestion control, in accordance with an embodiment of the present disclosure.

FIG. 8 is a fourth flowchart illustrating congestion control, in accordance with an embodiment of the present disclosure.

FIG. 9 is a schematic diagram illustrating how to measure a CBR, in accordance with an embodiment of the present disclosure.

FIG. 10 is a flowchart illustrating how to perform congestion control, in accordance with an embodiment of the present disclosure.

FIG. 11 is a first flowchart illustrating how to adjust a Power Spectral Density (PSD) of a Scheduling Assignment (SA), in accordance with an embodiment of the present disclosure.

FIG. 12 is a second flowchart illustrating how to adjust a PSD of a SA, in accordance with an embodiment of the present disclosure.

FIG. 13 is a schematic diagram illustrating a structure of a device, in accordance with an embodiment of the present disclosure.

FIG. 14 is a schematic diagram illustrating the resource reselection based on sensing;

FIG. 15 is a flow chart illustrating the resource reselection based on sensing;

FIG. 16 is a flow chart of the present disclosure;

FIG. 17 is a schematic diagram illustrating an anchor point for congestion control of the present disclosure;

FIG. 18 is a schematic diagram illustrating a first method of congestion control of the present disclosure;

FIG. 19 is a schematic diagram illustrating a second method of congestion control of the present disclosure;

FIG. 20 is a flowchart illustrating the processing of each resource pool independently by the present disclosure; and FIG. 21 is an apparatus diagram of the present disclosure.

MODE FOR THE INVENTION

To make objectives, technical solutions and advantages of the present disclosure more clear, detailed descriptions of the present disclosure will be further provided in the following, accompanying with attached figures and embodiments.

In V2X communications, UEs participating in communications may be divided into multiple categories, for example, vehicle (VUE), pedestrian (PUE) and Road-Side Unit (RSU), and so on. Assume that a data transmission mechanism of a UE is as follows. First of all, a UE transmits a control channel, which indicates time-frequency resources occupied by a data channel, Modulation and Coding Scheme (MCS), and so on, and is referred to as SA. Subsequently, the UE transmits data in a scheduled data channel. For a Long Term Evolution (LTE) D2D/V2X system, foregoing SA is also referred to as PSCCH. The data channel is also referred to as PSSCH. For a device, since data of the device is basically generated periodically within a time period, such device may reserve resources periodically, based on a certain reservation interval. Besides, each data can be transmitted repeatedly K times. Correspondingly, it is necessary to reserve K resources, in which K is greater than or equal to 1, thereby avoiding that some devices cannot receive such data due to limitations of half-duplex operations.

FIG. 2 illustrates a flowchart of the present disclosure.

In block 201, a UE measures a system load, and controls congestion based on a system load state and a priority, so as to adjust SA and data channel resources.

In actual operations of a V2X system, system load may be relatively large, thereby increasing interferences among UEs, and reducing reliability of communication. In order to maintain system stability, it is necessary to introduce congestion control. When processing congestion control, priority should be considered. To measure the load, a CBR may be introduced. Denote that a ratio of number of subchannels, Sidelink Receive Signal Strength Indicator (S-RSSI) of which within an observation window exceeds a certain threshold, to the total number of subchannels within the observation window is cbr. For example, the observation window is 100 ms. Foregoing cbr measured within one observation window may be directly taken as the CBR, which is configured to process congestion control. Alternatively, a high layer may process foregoing cbr measured within one observation window, e.g., perform an average, a weighted average, or a moving average on cbrs measured multiple times, and take a result as the CBR for processing congestion control.

The congestion control includes as follows. When the CBR is relatively large, it may be necessary to adjust an allowed transmission parameter adaptively, so as to reduce interferences among UEs as much as possible. Correspondingly, after a system is recovered from congestion state, e.g., when the CBR is relatively smaller, the transmission parameter may be adjusted adaptively, so as to optimize transmission performance. The adjustable transmission parameter of the UE may include number of occupied subchannels, MCS, the number of times data is transmitted, a transmission power parameter, and so on. In addition, when congestion occurs, some data or all the data may be discarded.

A UE may sense CBR and correspondingly control congestion, before selecting a resource, such that the resource may be selected, based on the most appropriate transmission parameter. Alternatively, the UE may sense CBR and correspondingly control congestion at more time positions.

In block 202, the UE transmits SA indicating data channel resources, and transmits data correspondingly.

The congestion control method in the present disclosure will be described in the following, accompanying with embodiments.

A First Embodiment

Congestion control is a necessary feature to guarantee stable operations of a V2X system. Within a cell coverage, a UE may report a measured CBR to a base station. Subsequently, the base station may configure and reconfigure transmission parameters of the UE, based on the CBR. On the basis of the transmission parameters configured by the base station, the UE may adjust SA thereof and transmission parameters of a data channel thereof, according to the currently measured CBR. Outside the cell coverage, the UE may obtain transmission parameters, by using other methods, e.g., pre-configured transmission parameters. Subsequently, the UE may adjust the SA thereof, and transmission parameters of a data channel thereof, based on the currently measured CBR. When processing congestion control, priority should be considered. For example, foregoing priority may be a ProSe Per-Packet Priority (PPPP). When the CBR is given, for different priorities, processes of the UE may be different.

In the existing V2X system, on the basis of synchronization source type and moving speed, value ranges of the following parameters are configured for the UE, that is, the number of occupied subchannels, MCS, and the number of times data is transmitted. In addition, transmission power related parameters, and/or, are also configured for the UE. When processing congestion control based on priority, in different cases distinguishing priority and CBR, multiple groups of transmission parameters are respectively configured or pre-configured. One group of transmission parameters may include the number of occupied subchannels, MCS, the number of times data is transmitted, transmission power related parameters, the maximum value CRlimit of Channel Occupation Ratio (CR), resource occupancy period, and so on. In a group of transmission parameters, similar to existing V2V system, on the basis of synchronization source type and moving speed, value ranges of the following parameters may be respectively configured, in which the parameters refer to the number of occupied subchannels, MCS, and the number of times data is transmitted. In a group of transmission parameters, whether to discard a data packet may be further indicated. When a group of transmission parameters indicate to discard a data packet, the other transmission parameters may be omitted, or may be not configured. Alternatively, it is permitted that a UE firstly adjusts the remaining transmission parameters, and then discards the data packet. For example, when the congestion problem still cannot be solved, after adjusting the remaining parameters, the data packet is discarded. In a group of transmission parameters, whether to discard a data packet may be not indicated explicitly, instead an implicit packet dropping policy is defined. Alternatively, in a group of transmission parameters, transmission power related parameters $P_{O\_PSSCH}$ and/or $\alpha_{PSSCH}$ may be a single value. Still alternatively, a value range of the transmission power related parameters $P_{O\_PSSCH}$ and/or $\alpha_{PSSCH}$ may be configured. For example, the maximum value and the minimum value of $P_{O\_PSSCH}$ and/or $\alpha_{PSSCH}$ may be respectively configured.

A first method for configuring transmission parameters in group is as follows. Denote that the number of priorities is N. For example, NP is equal to the number of PPPP levels, e.g., 8. And for each priority, the load level is further divided into NC intervals, based on the CBR. NC is greater than or equal to 2. Correspondingly, it is necessary to configure ($N_C$−1) CBR thresholds for each priority. The CBR threshold of a different priority may be the same, or may be different. Thus, for each CBR interval of a priority, a group of transmission parameters may be respectively configured, or pre-configured. By adopting such method, the number of groups for configuring transmission parameters may be $N_P \cdot N_C$. The UE measures the CBR. For a priority, when the measured CBR is located within a certain CBR interval of such priority, the UE may work, according to a group of transmission parameters of such CBR interval for this priority.

A second method for configuring transmission parameters in group is as follows.

Priorities are divided into $N_{PR}$ intervals. $N_{PR}$ is greater than, or equal to 2. Correspondingly, it is necessary to configure $N_{PR}$−1 priority thresholds. And each priority interval is further divided into NC CBR intervals. NC is greater than, or equal to 2. Subsequently, for each CBR interval of a priority interval, a group of transmission parameters may be respectively configured, or pre-configured. By adopting such method, the number of groups for configuring transmission parameters may be $N_{PR} \cdot N_C$. Here, $N_C$−1 CBR thresholds may be respectively configured for each priority interval. That is, for one or more priorities within a priority interval, the adopted CBR threshold is the same. The CBR threshold of a different priority interval may be the same, or different. The UE measures the CBR. For a priority, when the measured CBR is located within a certain CBR interval of a priority interval, where such priority is located, the UE may work for this priority, in accordance with a group of transmission parameters of such CBR interval. Alternatively, $N_C$−1 CBR thresholds may be respectively configured for each priority, so as to generate $N_C$·CBR intervals. The CBR threshold of a different priority may be the same, or different. For example, $N_c$−1 CBR thresholds are respectively configured for each PPPP level. The UE measures the CBR. For a priority, when the measured CBR is located within a certain CBR interval of such priority, the UE may work for this priority, in accordance with a group of transmission parameters of the same CBR interval for a priority interval, where such priority is located. As shown in FIG. 3, assume that $N_{PR}$=2, $N_C$=2, it is necessary to configure, or pre-configure 4 groups of transmission parameters. Here, assume that PPPP levels 1-3 adopt the same transmission parameters, while the remaining 5 kinds of PPPP also adopt the same transmission parameters. One CBR threshold may be still respectively configured for each kind of PPPP, so as to enable different PPPPs to control congestion in different CBR situations, thereby protecting services with higher priorities.

A third method for configuring transmission parameters in group is to divide $N_C$·CBR intervals, and respectively configure, or pre-configure a group of transmission parameters for each CBR interval. $N_C$ is greater than, or equal to 2. Foregoing each group of transmission parameters may be applicable for all the priorities. By adopting such method, the number of groups for configuring transmission parameters is $N_C$. Here, priorities may be divided into $N_{PR}$ intervals, in which NPR is greater than, or equal to 2. Meanwhile, $N_C$−1 CBR thresholds may be respectively configured for each priority interval. That is, for one or more priorities within a priority interval, the adopted CBR threshold is the same. The CBR threshold of a different priority interval may be the same, or different. The UE measures the CBR. For a priority, when the measured CBR is located within a certain CBR interval of a priority interval, where such priority is located, the UE may work for this priority, in accordance with a group of configured or pre-configured transmission parameters in the same CBR interval. Alternatively, $N_C$−1 CBR thresholds may be respectively configured for each priority, so as to generate $N_C$ CBR intervals. The CBR threshold of a different priority may be the same, or different. For example, $N_C$−1 CBR thresholds are respectively configured for each PPPP level. The UE measures the CBR. For a priority, when the measured CBR is located within a certain CBR interval of such priority, the UE may work for this priority, in accordance with a group of configured or pre-configured transmission parameters in the same CBR interval.

In foregoing methods for configuring transmission parameters in group, for a priority or a priority interval, by adopting $N_C$−1 CBR thresholds, which are denoted with $Th_{p,k}$, k=0,1, $N_C$−2, $Th_{p,k}$ is monotonously unreduced, when k is increasing. Subsequently, CBR is divided into $N_C$ intervals. For foregoing first method, p is a priority index, or an index of a priority interval. The first CBR interval refers to a case, where CBR is relatively smaller. For example, CBR≤$Th_{p,0}$, congestion does not occur. Transmission performance may be optimized as much as possible, by adopting a corresponding group of transmission parameters. Accompanying with increasing of j, j=2,3, . . . $N_C$, CBR of the $j^{th}$ interval is increased. For example, $Th_{p,j-1}$<CBR≤ $TH_{p,j}$, a group of transmission parameters corresponding to the $j^{th}$ interval may be more strict, so as to reduce interferences among UEs, e.g., a smaller number of occupied subchannels, a higher MCS, a smaller number of times data is transmitted, and/or, a smaller power transmission relevant parameter, and so on. Packet dropping operations corresponding to a CBR interval may be implicit. For example, first m CBR intervals may not support packet dropping operations, e.g., m=1, while the remaining CBR intervals support packet dropping operations. Alternatively, when meeting a condition, all the CBR intervals may support packet dropping operations, e.g., a calculated CR is greater than the maximum value CRlimit of CR. For a CBR interval supporting packet dropping operations, data may be directly discarded. That is, for a CBR interval supporting packet dropping operations, the other transmission parameters are omitted, or not configured. Alternatively, for a CBR interval supporting a packet dropping operation, it is permitted that a UE firstly adjusts the other transmission parameters, and then discards data packets. For example, when the congestion problem still cannot be solved by adjusting the other parameters, data packets are discarded. Alternatively, for a CBR interval, e.g., the remaining $N_C-1$ CBR intervals except for the first CBR interval, packet dropping is supported for some priorities. Foregoing some priorities may include one or more lowest priorities. For example, packet dropping is supported by each PPPP, threshold of which is less than a certain threshold Th1. Th1 is predefined, which is configured or pre-configured by a high layer, or is determined by a UE implementation. Here, assume that priority is lower, accompanying with a greater value of PPPP, for a CBR interval, e.g., the remaining $N_C-1$ CBR intervals except for the first CBR interval, when size of a data packet exceeds a certain threshold Th2, data is discarded. Th2 is predefined, configured or pre-configured by a high layer, or is determined by a UE implementation.

In foregoing methods for configuring transmission parameters in group, the first CBR interval generally denotes a case, where CBR is relatively smaller, e.g., congestion does not occur, at this time, the main objective is to optimize transmission performance. Each priority or each priority interval may share the same group of transmission parameters. Corresponding to foregoing first method, the first CBR interval of each priority may fixedly adopt the same group of transmission parameters. Thus, it is not necessary to distinguish priority and implement multiple configurations. A group of transmission parameters may be respectively configured for the remaining $N_C-1$ CBR intervals. Thus, the number of groups for configuring parameters is $N_P \cdot (N_C-1)+1$. Corresponding to foregoing second method, for each priority interval, the first CBR interval may fixedly adopt the same group of parameters. Thus, it is not necessary to distinguish priority interval and implement multiple configurations. A group of transmission parameters may be respectively configured for the remaining $N_C-1$ CBR intervals. Thus, the number of groups for configuring parameters is $N_{PR} \cdot (N_C-1)+1$. As shown in FIG. 4, assume that $N_{PR}=2$, $N_C=2$, for the first CBR interval, priority is not distinguished, and the same group of transmission parameters is adopted. Thus, it is necessary to configure or pre-configure 3 groups of transmission parameters. Here, assume that PPPPs with levels 1 to 3 adopt the same transmission parameters, while the other 5 kinds of PPPPs also adopt the same transmission parameters. One CBR threshold may be respectively configured for each kind of PPPP, so as to control different PPPPs to perform congestion control in various load situations, and protect services with higher priority. Corresponding to foregoing third method, a group of transmission parameters may be respectively configured for $N_C$ CBR intervals. Thus, the number of groups for configuring parameters is still $N_C$, due to the fact that the number of groups is not dependent on the number of priorities. The existing V2V system already supports to configure a group of transmission parameters, such as, the number of occupied subchannels, MCS, the number of times data is transmitted, a transmission power related parameter. The group of transmission parameters adopted by foregoing first CBR interval may be configured, according to a method of above V2V system. Alternatively, the group of transmission parameters adopted by foregoing first CBR interval may also be configured, by using a signaling structure same as that of the other $N_C-1$ groups of transmission parameters. By adopting such method, corresponding to foregoing first and second methods, signaling overheads are reduced, meanwhile processing complexity of a UE is also reduced, particularly for a case, where $N_C=2$.

For operations towards two directions of congestion control, that is, processing for congestion resulted from increasing of CBR, and processing for non-congestion resulted from reducing of CBR, division of foregoing $N_C$ CBR intervals may be the same. That is, CBR thresholds about two kinds of operations are the same. Alternatively, for foregoing two kinds of operations, although the number of divided CBR intervals is the same, the CBR threshold thereof may be different. In a case, where congestion occurs resulted from increasing of CBR, denote that a CBR threshold of a priority or a priority interval is $Th_{p,k}^{(C)}$. In a case, where congestion does not occur resulted from reducing of CBR, denote that a CBR threshold of a priority or a priority interval is $Th_{p,k}^{(NC)}$. The thresholds of foregoing two kinds of operations meet the condition: $Th_{p,k}^{(NC)} \leq Th_{p,k}^{(C)}$, thereby avoiding ping pong phenomenon of congestion control. Optional, it may define a CBR threshold $Th_{p,k}$ for a priority or a priority interval. $Th_{p,k}$ is used for either one of foregoing two cases. For example, in a case, where congestion occurs resulted from increasing of CBR, the CBR threshold of the other case is enabled to be $Th_{p,k}-\sigma$, $\sigma$ is an offset, e.g., 3 dB. Optional, the CBR threshold may be defined for a priority, or a priority interval. $Th_{p,k}+\sigma$ is used for either one of foregoing two cases, e.g., a case where congestion occurs resulted from increasing of CBR, and the CBR threshold of the other case is enabled to be $Th_{p,k}-\sigma$, $\sigma$ is an offset, e.g., 3 dB.

In foregoing methods for configuring transmission parameters in group, after dividing a priority or a priority interval into more than 2 CBR intervals, the first CBR interval corresponds to a case, where load is lighter, while the other CBR intervals correspond to cases, where load is heavier, and congestion degree therein is further divided, so as to adjust transmission parameters based on an interval located by the CBR.

A Second Embodiment

Congestion control is a necessary feature to guarantee stable operations of a V2X system. A UE needs to measure a CBR, controls congestion based on the CBR, and adjusts transmission parameters. When processing congestion control, the UE needs to consider priority. For example, the priority may be PPPP set for each data packet. In a case where CBR is given, for various priorities, processes of a UE may be different. The adjustable transmission parameters include the number of occupied subchannels, MCS, the number of times data is transmitted, and transmission power related parameters, $P_{O\_PSSCH}$, and/or, $\alpha_{PSSCH}$, and so on. In addition, a data packet may be discarded.

In the method for respectively configuring or preconfiguring multiple groups of transmission parameters, according to different cases in the first embodiment, where priority and CBR are distinguished, for a priority, or a priority interval, or all the priorities, 2 CBR intervals are divided. That is, $N_C=2$. The first CBR interval corresponds to a case, where CBR is relatively smaller, e.g., CBR is less than a threshold, and congestion does not occur. The second CBR interval corresponds to a case, where CBR is relatively greater, e.g., the CBR is greater than the threshold, congestion occurs, and other methods may be combined to process different congestion severities. Alternatively, for a priority, or a priority interval, or all the priorities, more than 2 CBR intervals may be divided.

In the method for respectively configuring or preconfiguring multiple groups of transmission parameters, according to different cases in the first embodiment, where priority and CBR are distinguished, assume that 2 CBR intervals are divided for a priority or a priority interval, that is, one CBR threshold $Th_p^{(C)}$ and $Th_p^{(NC)}$ is configured, or pre-configured for a priority or a priority interval, in which p is a priority index, or an index of a priority interval. $Th_p^{(C)}$ is applicable to a case, where CBR is increased and congestion occurs. $Th_p^{(NC)}$ is applicable to a case, where CBR is reduced and congestion does not occur. According to the method of the first embodiment, $Th_p^{(C)}$ and $Th_p^{(NC)}$ may be different, or may be the same, that is, $Th_p^{(C)}=Th_p^{(NC)}=Th_p$. Thus, it is necessary to configure or pre-configure one parameter.

A method for converting transmission parameters by a UE between two CBR intervals will be described in the following. Here, take the $n1^{th}$ CBR interval and the $n2^{th}$ CBR interval as an example, n1<n2, that is, the load of the $n2^{th}$ CBR interval is heavier than that of the $n1^{th}$ CBR interval. Foregoing two CBR intervals may be consecutive, that is, n2=n1+1. Alternatively, foregoing two CBR intervals may be not consecutive.

For a priority or a priority interval, assume that current UE works based on a group of transmission parameters of the $n1^{th}$ CBR interval, that is, in a state with a lighter load, the UE continuously senses the CBR. When sensing that the CBR belongs to the $n2^{th}$ CBR interval, the UE may adjust transmission parameters, based on a group of transmission parameters of the $n2^{th}$ CBR interval. Alternatively, as shown in FIG. 5, the UE may continuously sense the CBR. When a measurement value of the CBR in a time period with length $T_0$ meets a certain condition (501), the UE may adjust the transmission parameters (502), according to a group of transmission parameter of the $n2^{th}$ CBR interval; otherwise, the UE may still adjust the transmission parameters (500), based on a group of transmission parameters of the $n1^{th}$ CBR interval. The condition (501) needing to be met by foregoing CBR in the time period with length $T_0$ may be one of the following: 1) all the measurement values of the CBR in the time period with length $T_0$ belong to the $n2^{th}$ CBR interval; 2) a ratio that the measurement values of the CBR in the time period with length $T_0$ belong to the $n2^{th}$ CBR interval exceeds a certain ratio R, R is predefined, configured or pre-configured by a high layer, or is determined by a UE implementation; 3) at the end of the time period with length $T_0$, the measurement value of the CBR belongs to the $n2^{th}$ CBR interval. The processing for the $n2^{th}$ CBR interval may include a direct data dropping operation. For example, if the $n2^{th}$ CBR interval meets a condition for directly discarding data, the UE directly discards data. Foregoing condition for discarding data may be at least one of the following: 1) a group of transmission parameters of the $n2^{th}$ CBR interval indicate to directly discard data; 2) the $n2^{th}$ CBR interval is predefined to directly discard data; 3) the $n2^{th}$ CBR interval of some priorities is predefined to directly discard data. Foregoing some priorities may include one or more lowest priorities, e.g., each PPPP, the threshold thereof is less than a certain threshold Th1; 4) for the $n2^{th}$ CBR interval, when size of a data packet exceeds a certain threshold Th2, data is discarded.

Assume that the processing for the $n2^{th}$ CBR interval is not to directly discard data, which is to adjust transmission parameters, transmit SA and data, as shown in FIG. 6, a UE may continuously sense a CBR. When a measurement value of the CBR in a time period with length $T_{1,k}$ meets a certain condition (601), the UE may adjust transmission parameters once again (602), according to a group of transmission parameters of the $n2^{th}$ cBR interval, so as to further reduce generated interferences; otherwise, the UE performs other operations (603), e.g., the UE may maintain current transmission parameters unchanged, alternatively, when meeting another condition, the UE may adjust the transmission parameters and optimize transmission performance, based on a group of transmission parameters of the $n2^{th}$ CBR interval, alternatively, when meeting still another condition, the UE may adjust the transmission parameters, based on a group of transmission parameters of the $n1^{th}$ CBR interval. Foregoing block (601) may be executed repeatedly. K represents the number of times such block is executed repeatedly. K is equal to, or greater than 1. Corresponding to a different value of K, $T_{1,k}$ may be the same. That is, $T_{1,k}=T_1$. Subsequently, one parameter $T_1$ is needed. Alternatively, $T_{1,k}$ may be different. The condition (601) needing to be met by foregoing CBR in the time period with length $T_{1,k}$ may be at least one of: 1) all the measurement values of the CBR in the time period with length $T_{1,k}$ belong to the $n2^{th}$ CBR interval; 2) a ratio that the measurement values of the CBR in the time period with length $T_{i,k}$ belong to the $n2^{th}$ CBR interval exceeds a certain ratio R, R is predefined, configured or pre-configured by a high layer, or is determined by a UE implementation; 3) at the end of the time period with length $T_{i,k}$, the measurement value of the CBR belongs to the $n2^{th}$ CBR interval. The processing for the $n2^{th}$ CBR interval may include as follows. In a case, when attempting to adjust the transmission parameters, however, the congestion problem still cannot be solved, data is discarded. Foregoing condition for discarding data may be at least one of the following: 1) a group of transmission parameters of the $n2^{th}$ CBR interval indicate to discard data, when attempting to adjust the transmission parameters, however, the congestion problem still cannot be solved. 2) It is predefined that data is discarded of the $n2^{th}$ CBR interval, when attempting to adjust the transmission parameters, however, the congestion problem still cannot be solved. 3) It is predefined that data is discarded of the $n2^{th}$ CBR interval of some priorities, when attempting to adjust the transmission parameters, however, the congestion problem still cannot be solved. For example, foregoing some priorities may include one or more lowest priorities, e.g., each PPPP, threshold of which is less than a certain threshold Th1. 4) For the second CBR interval, if size of a data packet exceeds a certain threshold Th2, when attempting to adjust the transmission parameters, however, the congestion problem still cannot be solved, data is discarded. For example, when adjusting the transmission parameters N times, if the CBR in the time period with length $T_{1,N}$ belongs to the $n2^{th}$ CBR interval, the UE may discard the data. $T_{1,N}=T_1$, alternatively, $T_{1,N}$ may be different from $T_1$. N is predefined, configured or preconfigured by a high layer, or is determined by a UE implementation. Alternatively, assume that after adjusting the transmission parameters m times, all the adjustable transmission parameters have been configured, according to a principle of generating the minimum interference. The CBR in the time period with length $T_{1,m}$ belongs to the $n2^{th}$ CBR interval, the UE may discard the data. Alternatively, the processing for the $n2^{th}$ CBR interval may only adjust the transmission parameters, instead of discarding data. Thus, one of the following conditions may be met. 1) A group of transmission parameters of the $n2^{th}$ CBR interval indicate not to discard data; 2) it is predefined that the $n2^{th}$ CBR interval cannot discard data; 3) it is predefined that the $n2^{th}$ CBR interval of some priorities cannot discard data, e.g., foregoing some priorities may include one or more highest priorities, e.g., each PPPP, threshold of which is not less than a certain threshold Th1. For example, assume that after adjusting the transmission parameters m times, all the adjustable transmission parameters have been configured, based on a principle for generating the minimum interference. The CBR in the time period with length $T_{1,m}$ still belongs to the $n2^{th}$ CBR interval. The UE may transmit data, based on the latest transmission parameters adjusted.

For example, when sensing that the CBR belongs to the $n2^{th}$ CBR interval, the UE may adjust the transmission parameters, based on a group of transmission parameters of the $n2^{th}$ CBR interval, initiate a timer $t_1$, and set an initial value of $t_1$ to be $t_{1,1}$. The UE continuously senses the CBR. When the CBR continuously belongs to the $n2^{th}$ CBR interval, until the timer $t_1$ returns to zero, the UE adjusts the transmission parameters once again, according to a group of transmission parameters of the $n2^{th}$ CBR interval, so as to further reduce the generated interferences and reset the initial value of timer $t_1$ to be $t_{1,k}$, such block may be executed repeatedly.

For example, when sensing that the CBR belongs to the $n2^{th}$ CBR interval, the UE initiates a timer $t_0$, and sets an initial value of timer $t_0$ to be $T_0$. The UE continuously senses the CBR. When the CBR continuously belongs to the $n2^{th}$ CBR interval until the timer $t_0$ returns to zero, the UE may adjust the transmission parameters, based on a group of transmission parameter of the $n2^{th}$ CBR interval. And the UE may initiate a timer $t_1$, and sets the initial value of timer $t_1$ to be $T_{1,1}$. The UE continuously senses the CBR. When the CBR continuously belongs to the $n2^{th}$ CBR interval until timer $t_1$ returns to zero, the UE adjusts the transmission parameters once again, according to a group of transmission parameters of the $n2^{th}$ CBR interval, so as to further reduce generated interferences and reset the initial value of timer $t_1$ to be $T_{1,k}$. Such block may be executed repeatedly. K represents the number of times such block is executed repeatedly. K is equal to, or greater than 1.

Alternatively, for a priority or a priority interval, assume that current UE works, based on a group of transmission parameters of the $n1^{th}$ CBR interval, that is, in a state with a lighter load, when the UE senses that the CBR belongs to the $n2^{th}$ CBR interval, further assume that the transmission parameters are adjustable, based on a group of transmission parameters of the $n1^{th}$ CBR interval, so as to reduce interferences generated by the UE. Thus, the UE may still work, by using a group of transmission parameters of the $n1^{th}$ CBR interval. When it is not sufficient to reduce the generated interferences, after adjusting the transmission parameters according to a group of transmission parameters of the $n1^{th}$ CBR interval, the UE adjusts the transmission parameters, by adopting a group of transmission parameters of the $n2^{th}$ CBR interval.

For a priority or a priority interval, assume that current UE works, based on a group of transmission parameters of the $n2^{th}$ CBR interval, that is, in a state with a heavier load, as shown in FIG. 7, the UE continuously senses the CBR. When a measurement value of the CBR in a time period with length $T_0^{(NC)}$ meets a certain condition (701), the UE may adjust the transmission parameters (702), according to a group of transmission parameters of the $n1^{th}$ CBR interval; otherwise, the UE may still work, according to a group of transmission parameters of the $n2^{th}$ CBR interval. The condition needing to be met by foregoing CBR in the time period with length $T_0^{(NC)}$ may be at least one of: 1) all the measurement values of the CBR in the time period with length $T_0^{(NC)}$ belong to the $n1^{th}$ CBR interval; 2) a ratio that the measurement value of the CBR in the time period with length $T_0^{(NC)}$ exceeds a certaion ratio R, R is predefined, configured or pre-configured by a high layer, or is determined by a UE implementation; 3) at the end of the time period with length $T_0^{(NC)}$, the measurement value of the CBR belongs to the $n1^{th}$ CBR interval.

Alternatively, for a priority or a priority interval, assume that current UE works, based on a group of transmission parameters of the $n2^{th}$ CBR interval, that is, in a state with a heavier load. As shown in FIG. 8, the UE continuously senses the CBR. When a measurement value of the CBR in a time period with length $T_{1,k}^{(NC)}$ meets a certain condition (801), the UE may be unable to switch to a group of transmission parameters of the $n1^{th}$ CBR interval. Since the UE may work by adopting transmission parameters, which belong to a group of transmission parameters of the $n2^{th}$ CBR interval and are beneficial to reduce interferences among UEs, until restoring to adopt a group of transmission parameters of the $n1^{th}$ CBR interval, which may lead to congestion once again. That is, when the measurement value of the CBR in the time period with length $T_{1,k}^{(NC)}$ meets a certain condition (801), the UE may still adjust the transmission parameters, according to a group of transmission parameters of the $n2^{th}$ CBR interval. However, the UE may still select parameters (802) from a group of transmission parameters of the $n2^{th}$ CBR interval, which are beneficial to improve the transmission performance. Foregoing block (801) may be executed repeatedly. K is the number of times to repeat this block. K is greater than, or equal to 1. Corresponding to a different value of k, $T_{1,k}^{(NC)}$ may be the same. That is, $T_{1,k}^{(NC)}=T_1^{(NC)}$. Thus, only one parameter $T_1^{(NC)}$ is needed. Alternatively, $T_{1,k}^{(NC)}$ may be different. The condition (801) needing to be met by foregoing CBR in the time period with length $T_{1,k}^{(NC)}$ may be one of: 1) all the measurement values of the CBR in the time period with length $T_{1,k}^{(NC)}$ belong to the $n1^{th}$ CBR interval; 2) a ratio that, the measurement value of the CBR in the time period with length $T_{1,k}^{(NC)}$ belongs to the $n1^{th}$ CBR interval, exceeds a certain ratio R, R is predefined, configured or pre-configured by a high layer, or is determined by a UE implementation; 3) at the end of the time period with length $T_{1,k}^{(NC)}$, the measurement value of the CBR belongs to the $n1^{th}$ CBR interval. When foregoing CBR does not need to meet the condition (801) in the time period with length $T_{1,k}^{(NC)}$, the UE executes other operations (803). For example, the UE may maintain current transmission parameters unchanged. Alternatively, when meeting another condition, the UE may adjust the transmission parameters, based on a group of transmission parameters of the $n2^{th}$ CBR interval, and reduce interferences generated by the UE. Alternatively, when meeting still another condition, the UE may adjust the transmission parameters, based on a group of transmission parameters of the $n1^{th}$ CBR interval. After the transmission parameters have been adjusted N times, when the CBR in the time period with length $T_{1,N}^{(NC)}$ still belongs to the $n1^{th}$ CBR interval, the UE may process the transmission parameters in accordance with the $n1^{th}$ CBR interval. N is predefined, configured or pre-configured by a high layer, or is determined by a UE implementation. Alternatively, assume that after the transmission parameters have been adjusted m times, all the adjustable transmission parameters have been set, based on a principle for optimization transmission performance. When the CBR in the time period with length $T_{1,N}^{(NC)}$ still belongs to the $n1^{th}$ CBR interval, the UE may process the transmission parameters in accordance with the $n1^{th}$ CBR interval.

For example, when sensing that the CBR belongs to the $n1^{th}$ CBR interval, the UE initiates a timer $t_0$, and sets an initial value of $t_0$ to be $T_0$. The UE continuously senses the CBR. When the CBR continuously belongs to the $n1^{th}$ CBR interval until the timer $t_0$ returns to zero, the UE may adjust the transmission parameters, based on a group of transmission parameters of the $n1^{th}$ CBR interval.

For example, when sensing that the CBR belongs to the $n1^{th}$ CBR interval, the UE starts a timer $t_0$ and sets an initial value of $t_0$ to be $T_{1,1}^{(NC)}$. The UE continuously senses the CBR. If the CBR continuously belongs to the $n1^{th}$ CBR interval until the timer $t_0$ returns to zero, the UE may still adjust the transmission parameters, according to a group of transmission parameters of the $n2^{th}$ CBR interval. However, the UE may still select parameters from a group of transmission parameters of the $n2^{th}$ CBR interval, which are beneficial to improve the transmission performance, so as to further reduce the generated interferences and reset the initial value of timer $t_1$ to be $T_{1,k}^{(NC)}$. Such block may be executed repeatedly. K is the number of times such block is executed repeatedly. K is greater than, or equal to 1.

When performing congestion control, measurement M of congestion control may be introduced. Thus, in each congestion control, such measurement may be adjusted by using one step length. For example, foregoing measurement M may be $M=N_{SC} \cdot N_{TX} \cdot P_{O\_PSSCH}$. $NC_{SC}$ is the number of occupied subchannels. $N_{TX}$ is the number of times data is transmitted. $P_{O\_PSSH}$ is a transmission power related parameter. In a case, where CBR is greater than $TH_p^{(C)}$, a step length is denoted with $\Delta_{DEC}$. For example, $\Delta_{DE}=3$ dB. Each time after the transmission parameters are adjusted, $\Delta_{DEC}$ may be reduced from foregoing measurement M. Alternatively, a decrement of foregoing measurement M is not less than $\Delta_{DEC}$. In a case, where CBR is less than $Th_p^{(C)}$. A step length is denoted with $\Delta_{Inc}$. For example, $\Delta_{Inc}=3$ dB. Each time after the transmission parameters are adjusted, $\Delta_{Inc}$ is added to foregoing measurement M. Alternatively, an increment to foregoing measurement M is not greater than $\Delta_{Inc}$. Foregoing step length parameters $\Delta_{Inc}$ and $\Delta_{DEC}$ may be respectively defined, configured or pre-configured by a high layer, or is implemented by a UE. Foregoing step length parameters may be $\Delta_{Inc}=\Delta_{DEC}=\Delta$. Thus, it is only necessary to predefine, configure or pre-configure one step-length parameter.

A Third Embodiment

To guarantee stable operations of a V2X system, a UE needs to measure a CBR and correspondingly control congestion. Denote that a ratio of the number of subchannels, S-RSSI of which within an observation window exceeds a certain threshold, to the total number of subchannels within the observation window is cbr. For example, length L of the observation window is 100 ms. Foregoing cbr measured within one observation window may be directly taken as the CBR for processing congestion control. Alternatively, it may perform a process on foregoing cbr measured within one observation window, e.g., perform an average process, or a weighted average process, or a moving average process on the cbrs measured multiple times, and then a result is taken as the CBR for processing congestion control.

Regarding the method to obtain the CBR by processing the cbr, the observation window for measuring the cbr may be periodical. For example, the cbr is measured within X continuous observation windows every Pm ms. The period Pm is predefined, configured or pre-configured by a high layer, or is determined by a UE implementation. X is greater than, or equal to 1. X is predefined, configured or pre-configured by a high layer, or is determined by a UE implementation.

It is permitted that distribution of observation windows for measuring the cbr is not even within a time period. Furthermore, it may be guaranteed that the cbr has been measured a certain number of times, or in other words, a certain density is achieved within such time period. For example, the UE may measure the cbr, before selecting a resource. For example, a reserved interval of a UE is denoted with $P_{rsv}$. After a resource selection, a next resource selection may be after subframe $P_{rsv} \cdot j$. j is a random number between 5 and 15. That is, an interval between two adjacent resource selections is variable. From the point view of average effect, a resource selection is completed around every $P_{rsv} \cdot 10$ subframes. Correspondingly, an interval for measuring the cbr may also be variable. An average measurement interval is $P_{rsv} \cdot 10$ subframes. Before a resource selection, a UE may measure the cbr only within one observation window. Alternatively, the UE may measure the cbr within X observation windows. X is a predefined constant, or a value configured by a high layer, or a value pre-configured by the high layer, or is determined by a UE implementation. For example, $1 < X \leq 10$. Since the UE needs to sense channel state before selecting a resource, including: sense SA and receiving power, and measure received energy, so as to utilize such received energy measured to calculate the cbr. Subsequently, the UE does not need to measure the received energy at other time and position specially, so as to adopt the received energy to measure the cbr. Thus, it is possible to reduce processing complexity and energy consumption of the UE. This is particularly beneficial for a UE of a pedestrian (PUE), due to the fact that battery capacity of the PUE is limited. As shown in FIG. 9, here assume that a PUE only performs partial sensing on some subframes within a sensing window, in which the sensing window is located before resource reselection, e.g., length of the sensing window is 1000, the PUE selects resources at time (911-914). Correspondingly, the PUE senses within a sensing window, in which the sensing window is before time (911-914). From one aspect, sensing of the PUE within foregoing sensing window is used for resource selection, meanwhile supports cbr measurement (901-904), thereby reducing energy consumption of the PUE. Here, assume that the UE measures the cbr three times within one sensing window. After processing foregoing cbr measurement (901-904), the CBR (921) may be obtained. Foregoing measurement value of the cbr may be directly taken as the CBR, which is used for congestion control. Alternatively, regarding a method for processing the cbr to obtain the CBR, foregoing process may be performed before a resource selection, and it may perform a process on multiple cbr measurement values within the sensing window of such resource selection, e.g., perform an average process, a weighted average process, or a moving average process. Alternatively, it may also perform foregoing process on cbr measurement value within a sensing window of multiple resource selections, e.g., perform an average process, perform a weighted average process, or a moving average process, and so on. Assume that a sensing window with length 1000 is divided equally into 100 sub-windows, a PUE may only sense some subframes within each sub-window. For a resource selection, a position of a subframe actually sensed by the PUE within each sub-window is the same. The accuracy of the cbr may be improved, by performing a process on multiple measurement values of the cbr within current sensing window, e.g., taking an average value. However, for different resource selections, a position of a subframe actually sensed by the PUE within a sub-window may be different. That is, the cbr is actually measured at a different subframe position. The PUE may not perform a process on cbr, e.g., take an average value, in which the cbr corresponds to a different resource selection. When accuracy requirements of the CBR measurement are not met, by measuring the cbr within a sensing window before resource selection, in addition to the cbr measurement before resource selection, the UE may measure the cbr at some other timing positions, so as to obtain a more accurate CBR. The following scene may be avoided by using foregoing other timing positions. The cbr cannot be measured for a long time.

In addition, cbr measurement of a UE may have a variable frequency. For example, when the CBR obtained after measurement of a UE is relatively lower, that is, not greater than a certain threshold, e.g., congestion does not occur, the UE is permitted to reduce the frequency for measuring the cbr, which leads to a lower frequency for updating the CBR by a high layer, and a smaller impact on the UE's operation. When the measured CBR is relatively higher, that is, greater than a threshold, e.g., close to congestion, or congestion occurs, the UE may improve the frequency for measuring the cbr. From one aspect, measurement accuracy of the CBR may be improved. From another aspect, when the CBR continuously exceeds the threshold, the transmission parameters may be further adjusted, thereby improving response speed to congestion by the UE. Assume that a sudden change may not occur generally to a system's load situation, by adopting such method, when the system load is lower, energy consumed by the UE when measuring the cbr may be reduced. More particularly, when the CBR is lower, the UE may measure the cbr within one or more observation windows of a sensing window, in which the sensing window is located before the resource selection. However, when the CBR is higher, in addition to cbr measurement within the sensing window before the resource selection, the UE measures the cbr at more other time moments, so as to obtain a more accurate CBR timely, and improve performance for controlling congestion.

A Fourth Embodiment

Congestion control is a necessary feature for guaranteeing stable operations of a V2X system. A UE needs to measure a CBR, control congestion based on the CBR, and adjust transmission parameters. When processing congestion control, a UE needs to consider priority. For example, foregoing priority may be PPPP. In a case where CBR is given, a UE may perform a different process for a various priority. The adjustable transmission parameters include the number of occupied subchannels, MCS, the number of times data is transmitted, transmission power related parameters $P_{O\_PSSCH}$ and/or $\alpha_{PSSCH}$, and so on. In addition, a data packet may be discarded.

Depending on a measurement method of the CBR, for example, the method in the third embodiment, assume that the UE obtains the CBR by measuring a cbr before resource selection, the UE may control congestion based on the CBR, and apply the CBR to current operations of resource selection. Alternatively, in addition to measuring the cbr before resource selection, the UE also measures the cbr at other timing positions. After obtaining the CBR and controlling congestion, the UE is probably necessary to continuously occupy previously reserved resources to transmit SA and data.

The UE may control congestion and adjust the transmission parameters before resource selection, and then perform the resource selection according to the adjusted transmission parameters. The adjustable transmission parameters include the number of occupied subchannels, MCS, the number of times data is transmitted, transmission power related parameters $P_{O\_PSSCH}$ and/or $\alpha_{PSSCH}$, and so on. In addition, a data packet may be discarded.

Alternatively, operations of the UE to control congestion and adjust transmission parameters may be performed prior to resource selection, or at other positions. As shown in FIG. 10, on the basis of whether the timing of the UE for controlling congestion is before resource selection (1001), when the transmission parameters have been adjusted before resource selection, the UE performs the resource selection (1002) according to the adjusted transmission parameters. The adjustable transmission parameters include the number of occupied subchannels, MCS, the number of times data is transmitted, transmission power related parameters $P_{O\_PSSCH}$ and/or $\Delta_{PSSCH}$, and so on. In addition, a data packet may be discarded. When the transmission parameters are adjusted at other timing positions, the UE may work according to the adjusted transmission parameters on resources, which are reserved by a previous resource selection. The UE performs the resource selection (1003) according to the adjusted transmission parameters, until the UE needs to perform the resource selection. For example, if the number of adjusted subchannels is less than the number of subchannels of reserved resources, data transmission may be scheduled according to the number of adjusted subchannels. That is, only some of the reserved subchannels are occupied. If the adjusted number of times for transmitting data is less than the number of reserved resources for the same data, the data transmission may be scheduled, according to the adjusted number of times for transmitting data. That is, 2 resources are reserved for one data currently. However, since the adjusted number of times for transmitting data is 1, the UE only occupies one reserved resource to schedule data transmission. If the adjusted transmission power is smaller, SA and data may be transmitted, according to the adjusted power control parameters. If data needs to be discarded after adjustment, e.g., a calculated CR is greater than the maximum value of CR (CRlimit), the UE may not transmit SA and data on the reserved resources.

Alternatively, the UE may control congestion every N data transmissions, e.g., measure the CBR and adjust the transmission parameters. N is predefined, pre-configured, or is semi-statically configured by high-layer signaling. The foregoing N data transmissions may count the number of data transmissions for a periodic service, or count the number of data transmissions without distinguishing periodic and non-periodic services. Foregoing N may count the number of transmitted data. Alternatively, an initial-transmission and a re-transmission for one data are taken as two transmissions, so as to count the number. Still alternatively, by adopting foregoing method, the UE may control congestion every N data transmission, and meanwhile control congestion in each resource re-selection.

Regarding foregoing transmission parameters for congestion control, a priority sequence for adjusting these transmission parameters by a UE may be defined. For example, when system load is heavier, the UE may firstly reduce the number of occupied subchannels, and then reduce the number of times data is transmitted, adjust transmission power parameters, e.g., $P_{O\_PSSCH}$ and/or $\alpha_{PSSCH}$, and so on, finally the UE may discard data. By specifying the priority sequence for adjusting the transmission parameters, different UEs may be enabled to process congestion control with the same or similar principle, which is beneficial to implement better effect of congestion control. Adopting which priority sequence is not limited by the present disclosure.

Assume that a UE configures, or pre-configures multiple resource pools, within a resource pool, when the UE needs to discard data of at least one priority according to a result of congestion control, the UE re-selects resources from another resource pool, and transmits SA and data. Alternatively, when the UE needs to discard data of priorities of at least one priority interval, e.g., each PPPP less than a threshold, the UE re-selects resources from another resource pool, transmits SA and data. Alternatively, when the UE needs to discard data of all the priorities, the UE reselects resources from another resource pool, transmits SA and data. Preferably, the CBR of foregoing another resource pool is smaller, that is, congestion does not occur.

A Fifth Embodiment

Congestion control is a necessary feature to guarantee stable operations of a V2X system. A UE needs to measure a CBR, control congestion based on the CBR, and adjust transmission parameters. In the V2X system, a UE transmits SA indicating a scheduled data channel, and transmits data in the scheduled data channel. Since transmission mode and PSD of SA may be different from that of data channel, e.g., the PSD of the SA is 3 dB higher than the PSD of the data channel. Congestion situations of SA resources and digital channel resources are generally different. At this time, the CBR may be defined by SA and data channel allocation.

For the SA, a ratio of the number of SA resources, S-RSSI of which measured within an observation window exceeds a threshold $Th_{SA}$, to the total number of SA resources within the observation window is cbr_SA. One SA resource includes 2 consecutive PRBs. For example, length L of the observation window is 100 ms. Foregoing cbr_SA measured within one observation window may be directly taken as CBR of the SA, in which the CBR is used for congestion control. Alternatively, a high layer may perform a process on foregoing cbr_SA measured within one observation window, e.g., perform an average process, a weighted average process, or a moving average process on cbr_SA of multiple measurements, and a result is taken as the CBR of the SA for use in congestion control.

In one subframe, assume that the number of SA resources is N, probability for a UE to transmit SA on foregoing N SA resources may be different. For example, assume that the SA and data channel are located within one subframe, PRB of the SA and PRB of the data channel are not consecutive, for a UE, a data channel occupies one or more consecutive subchannels. An index of SA occupied by the UE and the minimum index of a subchannel of the occupied data channel are the same. By adopting such SA transmission mechanism, probability for occupying a various SA resource is different. For example, for the first SA resource, when data channel of the UE starts from the first subchannel, regarding the number of subchannels of any data channel between 1 and N, the SA of such UE is transmitted by occupying the first SA resource. For the last SA resource, when the data channel of the UE only occupies the Nth subchannel, the SA is transmitted on such SA resource. Since probability for the UE to transmit SA on foregoing N SA resources may be different, congestion state of each SA resource cannot be truly reflected by cbr_SA, which is obtained after comparing threshold $Th_{SA}$ with S-RSSI measured on each SA resource. A first method is as follows. Within one observation window, a parameter S-RSSI-O is obtained after compensating S-RSSI measured on each SA resource. Compensation amount for a various SA within one subframe may be the same, or different. A ratio of number of SA resources, S-RSSI-O of which exceeds a certain threshold $Th_{SA}$, to the total number of SA resources within the observation window is taken as cbr_SA, and is used for obtaining the CBR. Within one subframe, denote that the compensation value of S-RSSI of the $k^{th}$ SA resource is $\Delta_k$, S-RSSI-O=S-RSSI+$\Delta_k$, k=1,2, . . . , N·$\Delta_k$. is relevant with the probability to transmit the SA on the kth SA resource. For example, the compensation amount is smaller, accompanying with the greater probability for occupying the SA resource. $\Delta_k$ is predefined, configured or pre-configured by high-layer signaling, or is determined by a UE implementation. Alternatively, a second method is as follows. Within one observation window, for each SA resource, the threshold $Th_{SA}^{(O)}$ is obtained after adding an offset to threshold $TH_{SA}$. A threshold offset of a various SA within one subframe may be the same, or different. A ratio of the number of SA resources, S-RSSI of which measured on SA resources exceeds the corresponding threshold $Th_{SA}^{(O)}$, to the total number of SA resources within the observation window is taken as cbr_SA. The cbr_SA is configured to obtain the CBR. Within one subframe, denote that the threshold offset of the $k^{th}$ resource is $O_k$. $Th_{SA}^{(O)}$= $Th_{SA}+O_k$, k=1,2, . . . , N·$O_k$ is relevant with the probability for transmitting SA on the $k^{th}$ SA resource. For example, the offset is larger, accompanying with a greater probability for occupying the SA resource. $O_k$ is predefined, configured or pre-configured by high-layer signaling, or is determined by a UE implementation.

Since transmission mode of SA is different from that of data, CBR measurements for SA and data channel are generally different. Correspondingly, the following scene may occur. Congestion occurs in one channel. However, congestion does not occur in another kind of channel. As shown in FIG. 11, on the basis of whether CBR of SA is greater than CBR threshold of a corresponding SA (1101), processes are respectively performed. Assume that the CBR of the SA is greater, e.g., the CBR of the SA is greater than the CBR threshold of the corresponding SA. Such CBR threshold may be respectively defined for each priority, or each priority interval. Alternatively, the CBR threshold is shared by all the priorities. A method for processing congestion is to reduce transmission power of the SA, such that the PSD of the SA is $\Delta_{PSD}$ higher than the PSD of the data channel (1102), that is, the increment is $\Delta_{PSD}$; otherwise, the PSD of the SA is enabled to be $\Delta_{PSD}^{(Max)}$ higher than the PSD of the data channel, that is, the increment is $\Delta_{PSD}^{(Max)}$, e.g., $\Delta_{PSD}^{(Max)}$=3 dB (1103). When $\Delta_{PSD}$ is less than the SA, and congestion does not occur, the increment is $\Delta_{PSD}^{(Max)}$, e.g., $\Delta_{PSD}^{(Max)} \leq 3$ dB. $\Delta_{PSD}$ may be predefined, configured or pre-configured by high-layer signaling, or is determined by a UE implementation. More particularly, $\Delta_{PSD}$=0 dB. Such method may be applied to a case, where the CBR of the SA is larger, while the CBR of the data channel is smaller. Alternatively, such method may be adopted, when the CBR of the SA is greater, that is, not relevant with the CBR of the data channel. Alternatively, only if the CBR of at least one channel of SA and data channel is larger, that is, greater than the corresponding CBR threshold, the UE reduces the transmission power of the SA, such that the PSD of the SA is $\Delta_{PSD}$ higher than the PSD of the data channel, that is, the increment is $\Delta_{PSD}$; otherwise, the PSD of the SA is enabled to be $\Delta_{PSD}^{(Max)}$ higher than the PSD of the data channel, that is, the increment is $\Delta_{PSD}^{(Max)}$. When $\Delta_{PSD}$ is less than the SA, and congestion does not occur, the increment may be $\Delta_{PSD}$, e.g., $\Delta_{PSD}<3$ dB. $\Delta_{PSD}$ may be predefined, configured or pre-configured by high-layer signaling, or is determined by a UE implementation. More particularly, $\Delta_{PSD}$=0 dB.

Assume that the SA and the data channel are located within the same subframe, when SA and data channel of a UE occupy consecutive PRBs, resources of the UE occupy one or more consecutive subchannels, 2 PRBs therein, e.g., 2 PRBs with the lowest frequency are configured to bear the SA, while the other PRBs are configured to bear data. At this time, the CBR measured in a subchannel used for V2X meanwhile includes effects of SA and data transmission. It is not necessary to respectively define the CBR, by differentiating SA and data channel. Assume that the SA and the data channel are located within the same subframe, when PRB of the SA and PRB of the data channel are not consecutive, the CBR may be only measured in a subchannel used for transmitting data. Such CBR only includes effects of data transmission. Since congestion state of the SA is related with congestion state of the data channel, the CBR of this data channel may still reflect congestion state of this system. According to foregoing method, in the V2X system, a UE may only measure one kind of CBR, and is not necessary to specially measure congestion characteristics of the SA. By adopting such method, as shown in FIG. 12, on the basis of whether the CBR exceeds the CBR threshold (1201), processes are respectively performed. When the measured CBR is larger, e.g., greater than the CBR threshold, such CBR threshold may be respectively defined for each priority or each priority interval, or such CBR threshold may be shared by all the priorities. One method to process congestion is to reduce transmission power of the SA, such that the PSD of the SA is $\Delta_{PSD}$ higher than the PSD of the data channel (1202), that is, the increment is $\Delta_{PSD}$; otherwise, the PSD of the SA is enabled to be $\Delta_{PSD}^{(Max)}$ higher than the PSD of the data channel (1203), that is, the increment is $\Delta_{PSD}^{(Max)}$. When $\Delta_{PSD}$ is less than the SA, and congestion does not occur, the increment is $\Delta_{PSD}$, e.g., $\Delta_{PSD}$<3 dB. may be predefined, configured or pre-configured by high-layer signaling, or is determined by a UE implementation. More particularly, $\Delta_{PSD}$=0 dB.

A Sixth Embodiment

Congestion control is a necessary feature to guarantee stable operations of a V2X system. Within a cell coverage, a UE may report a measured CBR to a base station, such that the base station may configure and reconfigure transmission parameters of the UE based on the CBR. On the basis of the transmission parameters configured by the base station, as well as currently measured CBR and priority, the UE may adjust SA thereof and transmission parameters of a data channel thereof. Outside the cell coverage, the UE may obtain the transmission parameters by adopting another method, e.g., pre-configured transmission parameters, so as to adjust the SA thereof and transmission parameters of the data channel thereof based on currently measured CBR and priority. Specifically speaking, a group of transmission parameters may be respectively configured or pre-configured for each CBR interval and each priority, or each priority interval, such that the UE may adjust the transmission parameters based on priority and CBR interval, to which current measurement value of CBR belongs, e.g., by adopting the method in the first embodiment.

A group of transmission parameters may include the number of occupied sub-channels, MCS, the number of times data is transmitted, a transmission power related parameter, the maximum value (CRlimit) of CR, a resource occupancy period, and so on. For example, the following values may be respectively configured or pre-configured, the range of the number of occupied subchannels, MCS range, the range of the number of times data is transmitted, the maximum value of transmission power. The maximum value of transmission power may be set, by using the transmission power related parameter $P_{O\_PSSCH}$ and/or $\alpha_{PSSCH}$.

Foregoing CR refers to that, within a time period T, the ratio of the number of sub-channels actually occupied by the UE to the total number of subchannels. For example, length L of foregoing time period T may be 1000 ms, or some other value. After determining a group of transmission parameters based on currently measured CBR and priority, it is necessary to ensure the calculated CR to be less than, or equal to CRlimit among this group of parameters, by using parameters, such as, the number of sub-channels occupied by the UE, and the number of times data is transmitted.

Denote that the UE needs to transmit data in subframe n, foregoing measurement time period T of CR may be subframe n and L−1 subframes before subframe n, that is, the subframe range is [n−L+1,n]. It is necessary to ensure the CR calculated within [n−L+1,n] to be less than, or equal to CRlimit, on the basis of whether the UE actually transmits data in subframe n. By adopting such method, for each data transmission of the UE, it is guaranteed that the CR is not greater than current CRlimit until current data transmission. However, assume that measurement value of CBR is increased, and the CRlimit of a CBR interval to which the measurement value of CBR belongs is smaller, and assume that a relatively large amount of data has already been transmitted by current UE before subframe n, by adopting such method to define measurement time period T of CR, the UE may not transmit data during a longer time period.

Denote that the UE needs to transmit data in subframe n, foraging measurement time period T of CR may be subframe n and L−1 subframes after subframe n, that is, the subframe range is [n,n+L−1]. In other words, the UE may predict service amount of subframe range [n,n+L−1], so as to calculate CR. It is necessary to ensure the CR calculated within [n,n+L−1] to be less than, or equal to CRlimit, on the basis of whether the UE actually transmits data in subframe n. The service amount of forgoing predicted subframe range [n,n+L−1] may be determined, based on current reservation interval and size of data packet of the UE. Such method depends on accuracy of the predicted service amount. By adopting such method, the UE may not refer to service amount transmitted before subframe n. If the predicted service amount does not exceed CRlimit, when the UE has already transmitted a relatively large amount of data before current subframe n, the UE may continuously occupy more resources.

When calculating foregoing CR within subframe n, the measurement time period T of foregoing CR may include L subframes in total at subframe n, before subframe n and after subframe n, that is, the subframe range is [n−$L_1$,n+$L_2$−1], $L_1$+$L_2$=L. More particularly, when $L_2$=L, $L_1$=0, such method is the same as the previous method. Assume that the UE needs to transmit data in subframe n, it is necessary to ensure the CR calculated within [n−$L_1$,n+$L_2$−1] to be less than, or equal to the CRlimit, on the basis of whether the UE actually transmits data in subframe n. When the UE selects resources in subframe n, that is, the UE selects C_resel resources according to a reservation interval, if data is transmitted 2 times, foregoing resources include channel resources of 2 subframes. Assume that these reserved resources are all used for data transmission of the UE, the CR calculated within [n−$L_1$,n+$L_2$−1] may be ensured to be less than, or equal to the CRlimit. By adopting such method, the service amount of subframe n and $L_2$ subframes after subframe n may be determined, based on reservation interval and size of a data packet of the UE. By adopting such method, the service amount already transmitted by the UE before subframe n and service amount to be transmitted are both taken care of, so as to better reflect characteristics for occupying resources by this UE. Foregoing parameter $L_2$ may be predefined, pre-configured or configured by a base station, or is a parameter related with a UE. For example, $L_2$ may be equal to reserve internal $P_{step} \cdot L_2$. may be an interval P of current reserved resource of the UE, $P = i \cdot P_{step}$. For example, $P_{step} = 100$. The value range of i is a subset of [⅕,½,1,2,3,4,5,6,7,8,9,10] configured by high-layer signaling. $L_2$ may be the minimum value of an available reservation interval, which is configured by high-layer signaling. Alternatively, assume that data of subframe n needs to be transmitted 2 times. $L_2$ is greater than, or equal to a subframe interval for transmitting the same data 2 times. That is, the time period T for calculating CR includes a subframe transmitting foregoing data 2 times.

Foregoing CR may be respectively calculated for each transmission resource pool, so as to control resource occupancy of the UE in each transmission resource pool. Alternatively, foregoing CR may be respectively calculated for each carrier used for V2X transmission. One or more transmission resource pools may be configured, or pre-configured on one carrier. And then, the CR calculated in foregoing one or more resource pools may be less than, or equal to the CRlimit, so as to control resource occupancy of the UE on each carrier. Foregoing CR may be only applicable to a UE working in transmission mode 4. While, for transmission mode 3, a base station may control resource occupancy situation of the UE. Alternatively, foregoing CR may include resource occupancies of transmission modes 3 and 4 simultaneously. When the CR occupied by the total resources of transmission modes 3 and 4 are greater than the CRlimit, data transmission may be processed according to a certain priority strategy, which is defined by transmission mode, and/or, PPPP of data. For example, a service priority of transmission mode 3 is higher than that of transmission mode 4. Alternatively, data transmission is processed, according to PPPP of a service. Still alternatively, a PPPP level higher than a set threshold of transmission mode 3 exceeds a corresponding PPPP level of transmission mode 4. A PPPP level higher than a set threshold of transmission mode 4 exceeds PPPP level of transmission mode 3, which is not higher than a set threshold. A PPPP level not higher than a set threshold of transmission mode 3 exceeds a corresponding PPPP level of transmission mode 4. By adopting such method, data transmitted by a UE may be coordinated according to transmission modes 3 and 4.

Foregoing resource occupancy period may refer to an interval P of reserved resources of the UE, $P = k \cdot P_{step}$. For example, $P_{step} = 100$. A value range of k is a subset of [⅕, ½,1,2,3,4,5,6,7,8,9,10]. Thus, when selecting resources, the UE selects an appropriate reservation interval Pm from a permitted reservation interval set, according to a priority and a CBR interval to which current measurement value of CBR belongs, such that the UE reserves C_resel resources, according to the reservation interval Pm. For example, C_resel=10*R, R is a random integer between 5 and 15. Alternatively, assume that the UE has already selects resources with a reservation interval Pn, and is transmitting data by using reserved resources, when the measurement value of CBR changes, e.g., a CBR interval located by current measurement value of CBR is different from a CBR interval, which is used when selecting resources with reservation interval Pn. Assume that the permitted reservation interval set, which is determined by current measurement value of CBR and priority, does not include Pn, the UE may re-select resources based on the permitted reservation interval. Still alternatively, when all the currently permitted reservation intervals are greater than Pn, the UE may enable an interval of remaining reserved resources to belong to currently permitted reservation interval, by discarding some reserved resources. Alternatively, the UE may enable an actual CR to achieve, or almost achieve the CR, which is obtained according to currently permitted reservation interval, by using a packet-dropping operation. Still alternatively, when currently permitted reservation interval is less than Pn, the UE may still reserve resources based on Pn. In addition, foregoing resource occupancy period may also be taken as a parameter and submitted to a high layer to be processed, e.g., may be submitted to an application layer, such that a service period generated by the application layer matches with foregoing reserve occupancy period.

A Seventh Embodiment

Congestion control is a necessary feature to guarantee stable operations of a V2X system. Specifically speaking, a group of transmission parameters may be respectively configured, or pre-configured, for each CBR interval and each priority, or each priority interval. Subsequently, a UE may adjust transmission parameters, according to a priority and a CBR interval, to which current measurement value of CBR belongs, e.g., by adopting the method in the first embodiment. The group of transmission parameters may include the number of occupied subchannels, MCS, the number of times data is transmitted, a transmission power related parameter, the maximum value CRlimit of CR, a resource occupancy period, and so on. After determining foregoing group of transmission parameters, based on the priority and the CBR interval, to which current measurement value of CBR belongs, when the UE selects resources, the UE needs to determine reserved resources based on the group of transmission parameters.

A first method is as follows. The UE determines the reserved resources, based on foregoing group of transmission parameters. That is, the UE reserves one or more resources, based on a reservation interval. Assume that all of these reserved resources are used for the UE's transmission, such that a CR calculated at each time moment within a time period of reserved resources is less than, or equal to current CRlimit. For example, denote that the reserved resources are located within subframe $t_j = k + j \cdot i \cdot P_{step}$, $j = 0,1, \ldots C_{resel} - 1$. i refers to reservation interval information indicated in the SA. Subsequently, the CR calculated in each subframe $t_j$ needs to be less than the CRlimit. For example, the method for calculating CR in the sixth embodiment may be adopted. By adopting such method, it is guaranteed that CR of resource occupancy is not greater than CRlimit, according to current measurement value of CR.

A second method is as follows. The UE determines reserved resources, based on foregoing group of transmission parameters. That is, the UE reserves one or more resources, based on a reservation interval. Assume that all of these reserved resources are used for the UE's transmission, it is permitted that the CR calculated at one or more time moments within a time period of reserved resources is greater than current CRlimit. For example, denote that the reserved resources are located within a subframe $t_j = k + j \cdot i \cdot P_{step}$, $j = 0,1, \ldots C_{resel} - 1$. Subsequently, it is permitted that the CR calculated within one or more subframes $t_j$ is greater than CRlimit. For example, the method for calculating CR in the sixth embodiment may be adopted. When selecting resources based on foregoing group of transmission parameters and determining the reserved resources, the UE does not consider the impact of CRlimit at all. That is, the UE may only consider values or value ranges of other parameters in foregoing group of transmission parameters, except for CRlimit, or, the UE may still consider the impact of CRlimit, such that the CR calculated based on reserved resources may exceed CRlimit, however foregoing CR calculated is still within a set range, e.g., ensure the calculated CR to be less than, or equal to CRlimit+delta. Delta is predefined, configured or pre-configured by a high layer, or is determined by a UE implementation.

Here, although in a case, where assume that all the reserved resources are occupied, CR is greater than CRlimit, the UE may ensure the CR of an actual data transmission to be less than, or equal to the CRlimit, by discarding some data or adopting another method, e.g., reducing the number of occupied subchannels, or reducing the number of times data is transmitted. By adopting such method, freedom for a UE to reserve resources is provided. More particularly, when the measurement value of CBR is getting smaller, that is, the CBR interval may be changed, and a new CRlimit may become larger, even if the UE occupies all of the foregoing reserved resources within subsequent time periods, the CR may not exceed the new CRlimit. By adopting such method, in a case, where CR is not greater than CRlimit, chances for the UE to transmit data are increased.

An Eighth Embodiment

Congestion control is a necessary feature for guaranteeing stable operations of a V2X system. Specifically speaking, a group of transmission parameters may be respectively configured or pre-configured, for each CBR interval and each priority, or each priority interval. Subsequently, the UE may adjust the transmission parameters, based on a priority and a CBR interval, to which current measurement value of CBR belongs, e.g., by adopting the method in the first embodiment. Foregoing group of transmission parameters may include the number of occupied subchannels, MCS, the number of times data is transmitted, a transmission power related parameter, the maximum value CRlimit of CR, a resource occupancy period, and so on. After determining foregoing group of transmission parameters, based on the priority and the CBR interval, to which current measurement value of CBR belongs, the UE determines reserved resources based on such group of transmission parameters.

Foregoing CR refers to that, within a time period T, a ratio of the number of sub-channels, which are actually occupied by a UE, to the total number of subchannels. For example, length L of foregoing time period T may be 1000 ms or some other value. After determining a group of transmission parameters based on currently measured CBR and priority, it is necessary to ensure the calculated CR to be less than, or equal to CRlimit in this group of parameters, by using parameters, such as, the number of subchannels occupied by the UE and the number of times data is transmitted.

Foregoing CR may not differentiate priority of data. That is, foregoing CR may be jointly calculated for all the data transmissions of the UE. Within the time period T, PPPP levels are not differentiated. The CR is defined as a ratio of the number of sub-channels, which are actually occupied by the UE for transmitting data, to the total number of subchannels. For a group of transmission parameters with PPPP level m within a CBR interval c, the CRlimit is the permitted maximum value of the CR. When the CR is greater than the CRlimit resulted from the UE's data transmission, the UE may ensure the CR of data transmission to be less than, or equal to the CRlimit, by discarding some data or adopting another method, e.g., reducing the number of occupied subchannels, or reducing the number of times data is transmitted.

Alternatively, foregoing CR may also be defined based on a service priority. Here, a PPPP level may be differentiated for each data area, and a CR is calculated correspondingly. Still alternatively, for multiple data transmitted on reserved resources, which are reserved by the UE after each resource selection, CR may be calculated according to the same PPPP level. For example, the same PPPP level may refer to the PPPP level, which is used when performing resource selection to reserve resources. Alternatively, assume that multiple resource selection processes belong to a UE, each resource selection process may reserve resources independently, based on a respective reservation interval. For example, a different resource selection process may be applicable to a different service. The CR may be calculated for data of each resource selection process, based on the same PPPP priority. The PPPP priority may be one of all the PPPP levels, which are possible to be used in a corresponding resource selection process, e.g., the minimum value of all the possibly used PPPP levels, so as to reduce resource occupancy of the UE and generated interferences as much as possible, or, the maximum value among all the possibly used PPPP levels, so as to fully guarantee performance of a service with a higher priority.

Foregoing CR may be respectively calculated for a different data priority. For example, the CR is respectively calculated for each PPPP level m, and the calculated CR is denoted with $CR_m$. Within the time period T, a ratio of the number of sub-channels, which are actually occupied by the UE for transmitting data of a PPPP level, to the total number of subchannels, is the CR corresponding to such PPPP level. Regarding the method for respectively configuring a group of transmission parameters by differentiating CBR interval and priority, e.g., the method in the first embodiment, methods for defining CRlimit of a group of transmission parameters in the present disclosure will be described in the following.

A first method for defining CRlimit of a group of transmission parameters, which correspond to CBR interval c and PPPP level m, is the maximum value of CR of data with PPPP level m, which is transmittable by the UE. When the CR of PPPP level m is greater than CRlimit, due to data transmission of PPPP level m of the UE, the UE may ensure the CR of actual data transmission with PPPP level m is less than, or equal to CRlimit, by discarding some data or adopting another method, e.g., reducing the number of occupied subchannels, or reducing the number of times data is transmitted.

A second method for defining CRlimit of a group of transmission parameters, which correspond to CBR interval c and PPPP level m, is the maximum value of a ratio of the number of subchannels, which are only used for transmitting data with PPPP value greater than or equal to m, to the total number of subchannels. Denote that CRlimit in the group of transmission parameters corresponding to CBR interval c and PPPP value k is $CR_{lim\ it}^{c,k}$. Subsequently, for CBR interval c and PPPP value m, the sum of CR of data with PPPP level less than or equal to m, which is permitted to be transmitted by the UE, that is, $$\sum_{k=1}^{m} CR_m$$

is less than, or equal to $$\sum_{k=1}^{m} CR_{limit}^{c,k}.$$

When controlling congestion, it is necessary to meet requirements of CRlimit corresponding to each PPPP value simultaneously. When the UE still possesses data with PPPP level greater than m, depending on a priority processing method, the sum of CR of data, which is able to be transmitted by UE and PPPP level thereof is less than, or equal to m, may be less than $$\sum_{k=1}^{m} CR_{limit}^{c,k}.$$

When the sum of CR of data transmission about the UE is greater than $$\sum_{k=1}^{m} CR_{limit}^{c,k},$$

in which PPPP level of the data transmission is less than or equal to m, the UE may discard some data or adopt another method, e.g., reduce the number of occupied subchannels or reduce the number of times data is transmitted, such that the sum of CR of data transmission is less than or equal to $$\sum_{k=1}^{m} CR_{limit}^{c,k},$$

which actual PPPP level of the data transmission is less than or equal to m.

A third method for defining CRlimit of a group of transmission parameters, which correspond to CBR interval c and PPPP level m, is the maximum value of the sum of CR about data, which is permitted to be transmitted by the UE and PPPP level thereof is less than, or equal to m. Denote that CRlimit of a group of transmission parameters, which correspond to CBR interval c and PPPP value k, is $CR_{lim\ it}^{c,k}$. The sum of CR of data, which is permitted to be transmitted by the UE and PPPP level thereof is less than, or equal to m, e.g., $$\sum_{k=1}^{m} CR_m$$

is less than or equal to $CR_{lim\ it}^{c,k}$. When controlling congestion, it is necessary to meet requirements of CRlimit corresponding to each PPPP value simultaneously. For CBR interval c and PPPP value m, the maximum value of a ratio of the number of subchannels, which are only used for transmitting data with PPPP value greater than or equal to m, to the total number of subchannels, is $CR_{lim\ it}^{c,m} - CR_{lim\ it}^{c,m-1}$. When the UE still possesses data with PPPP level greater than m, depending on the priority processing method, the sum of CR of data may be less than $CR_{lim\ it}^{c,m}$, in which the data is able to be transmitted by the UE and PPPP level thereof is less than, or equal to m. When the sum of CR of data transmission about the UE is greater than $CR_{lim\ it}^{c,m}$, in which PPPP level of the data transmission is less than or equal to m, the UE may discard some data or adopt another method, e.g., reduce the number of occupied subchannels, or reduce the number of times data is transmitted, such that the sum of CR of data transmission is less than or equal to $CR_{lim\ it}^{c,m}$, in which the actual PPPP level of the data transmission is less than or equal to m.

A fourth method for defining CRlimit of a group of transmission parameters, which correspond to CBR interval c and PPPP level m, is as follows. The maximum value of CR of data is denoted with $CR_{lim\ it}^{c,m}$, in which the data is transmittable by the UE and PPPP level thereof is m. That is, the maximum value of CR of data may be equal to $CR_{lim\ it}^{c,m}$, in which PPPP level of data transmitted by the UE is m. The CR of transmittable data with PPPP level m is not affected by data with PPPP level less than m, which is transmitted by the UE. However, when the UE still possesses data with PPPP level greater than m, depending on a priority processing method, the CR of data transmittable by the UE may be less than $CR_{lim\ it}^{c,m}$, in which PPPP level of foregoing data is m. For a CBR interval c, $CR_{lim\ it}^{c,m+1}$ is generally greater than or equal to $CR_{lim\ it}^{c,m}$, which denotes that the UE is permitted to transmit more data with PPPP level greater than m. More particularly, the maximum value of a ratio of the number of subchannels, which are only used for transmitting data with PPPP level greater than m, to the total number of subchannels, is $CR_{lim\ it}^{c,m+1} - CR_{lim\ it}^{c,m}$. When the CR of PPPP level greater than m is relatively smaller, the data amount with PPPP level m transmitted by the UE may be not affected. For example, regarding data with PPPP level greater than m, assume that the sum of the data's CR is less than, or equal to $CR_{lim\ it}^{c,m+1} - CR_{lim\ it}^{c,m}$, data transmission with PPPP level m is not affected by data transmission with PPPP level greater than m. That is, regarding data with PPPP level m, the maximum value of CR of the data, which is transmitted by the UE, may be equal to $CR_{lim\ it}^{c,m}$. When the sum of CR of data with PPPP level (m+1) is greater than $CR_{lim\ it}^{c,m+1} - CR_{lim\ it}^{c,m}$, the CR of data with PPPP level m, which is transmittable by the UE, may be less than $CR_{lim\ it}^{c,m}$. Thus, when the UE determines whether data with PPPP level m can be transmitted, after removing the data amount with PPPP level greater than m, which is allowed to be transmitted additionally by CRlimit with PPPP level greater than m, the data transmission with PPPP level m may be processed, based on $CR_{lim\ it}^{c,m}$ of PPPP level m. Denote that the maximum value of PPPP is M. The CR of data transmission with PPPP level m needs to meet:

$$CR_m + \max\left[\left(\sum_{k=m+1}^{M} CR_k\right) - (CR_{limit}^{c,M} - CR_{limit}^{c,m}), 0\right] \leq CR_{limit}^{c,m}.$$

The CR of data transmission with PPPP level M needs to meet: $CR_M \leq CR_{lim\ it}^{c,M}$. When CR with PPPP level m does not meet the foregoing condition, the UE may adjust the data transmission with PPPP level m, e.g., discard some data or adopt another method, for example, reduce the number of occupied subchannels, or reduce the number of times data is transmitted, such that the CR of data transmission with PPPP level m meets the foregoing condition.

Foregoing CR may be jointly calculated for all the data transmissions of the UE within a priority range. For example, within a time period T, a CR corresponding to PPPP level m is defined as a ratio of the number of subchannels, which are actually occupied by the UE and used for transmitting data with PPPP level less than, or equal to m, to the total number of subchannels. Regarding a method for respectively configuring a group of transmission parameters by differentiating CBR interval and priority, e.g., the method in the first embodiment, the CRlimit in the group of transmission parameters, which correspond to a CBR interval c and PPPP m, may be defined as, the maximum value of CR of data with PPPP level less than or equal to m, which is allowed to be transmitted by the UE, that is, the maximum value of CR corresponding to PPPP level m. Denote that the CRlimit in a group of transmission parameters, which correspond to CBR interval c and PPPP value k, is $CR_{lim\ it}^{c,k}$. For CBR interval c and PPPP value m, the maximum value of a ratio of the number of sub-channels, which are only used to transmit data with PPPP value greater than or equal to m, to the total number of subchannels, is $CR_{lim\ it}^{c,m} - CR_{lim\ it}^{c,m-1}$. When the UE still possesses data with PPPP level greater than m, depending on a priority processing method, regarding data with PPPP level less than or equal to m, which is transmittable by the UE, the CR of the data may be less than $CR_{lim\ it}^{c,m}$. When CR of a data transmission of a UE is greater than $CR_{lim\ it}^{c,m}$, in which PPPP level of the data transmission is less than or equal to m, the UE may discard some data or adopt another method, e.g., reduce the number of occupied subchannels, or reduce the number of times data is transmitted, such that the CR of the data transmission is less than or equal to $CR_{lim\ it}^{c,m}$, in which actual PPPP level of the data transmission is less than or equal to m.

Corresponding to the foregoing method, the present disclosure also provides a device. The device can be configured to implement foregoing method. As shown in FIG. 13, the device includes a congestion sensing module, a congestion controlling module and a transceiver module.

The congestion sensing module is configured to measure a CBR.

The congestion controlling module is configured to control congestion based on the CBR and a priority, so as to adjust SA and data channel resources.

The transceiver module is configured to receive a SA and a data channel from another device, transmit the SA and the data channel of the device, based on a selected channel resource.

Persons having ordinary skill in the art may understand that all the blocks, or some blocks of foregoing method embodiment may be completed, by related hardware instructed by a program. The program may be stored in a computer readable storage medium. When executing the program, one block or combination of blocks about the method embodiment may be included.

In addition, each functional unit in foregoing embodiment of the present disclosure may be integrated into a processing module. Alternatively, each unit may be an independent physical entity. Still alternatively, two or more units may be integrated into one module. Foregoing integrated module may be implemented in the form of hardware, or in the form of software functional modules. When being implemented in the form of software functional modules, and is taken as an independent product to be saled or used, the integrated module may also be stored in a computer readable storage medium.

The foregoing storage medium may be a Read-Only Memory (ROM), a disk, or a Compact Disk (CD), and so on.

In order to make the purpose, the technical scheme and advantages of the present disclosure more clearly, the present disclosure is further described in detail with reference to the accompanying embodiments and drawings.

In V2X communications, a device participated in communications (UE) may be divided into several types, such as vehicle UE (VUE), person UE (PUE) and roadside units (RSU). Assume that the data transmission mechanism of the UE includes, first of all, the UE sends information in a control channel used for indicating information such as time-frequency resources occupied by data channel and modulation coding scheme (MCS), wherein, the control channel referred to as a scheduling assignment (SA) signaling; next, the UE transmits data in the scheduled data channel. For an LTE D2D/V2X system, the SA is also called PSCCH, and the data channel is also called PSSCH. For a device, because it's data is generated in a cycle basically within a period of time, the device may reserve resources periodically according to a reserved interval; and each group of data can be transmitted K times repeatedly, correspondingly K times resources is need to be set aside, wherein K is greater than or equal to 1, thus the problem that some device may not receive the data because of the restrictions of half duplex operation is avoided. FIG. 16 is a flow chart of the present disclosure.

Step 1601: UE performs a resource reselection, performs a congestion control according to a running state of a system, and determines resources of an SA and data channels occupied by the UE.

Based on the method shown in FIG. 15, the UE may detect the SA from other UEs and measure the received power of data channels scheduled by the SA which is received correctly. And the UE may measure the received energy of resources in a sensing window. So the UE may select resources and avoid collision with other UEs as much as possible. In actual work of V2X system, the traffic load may be relatively large, which will cause interferences between the UEs and reduce the reliability of communications. In order to maintain the stability of the system, a congestion control is necessary. That is, the UE needs to detect the level of load of the system, and when the load reaches a certain level, the UE needs to adjust the allowed transmission parameters adaptively, so as to minimize the interferences between the UEs as much as possible. The congestion control may also refer to, when UE has multiple resource pools, the UE chooses a unstuffed resource pool; or, the UE chooses a resource pool with a lower level of load; or, when more than one resource pools are congested, the UE chooses a resource pool with a lower level of load; or, when multiple the resource pools are congested, the UE randomly selects a resource pool. The congestion control may also refer to, assuming that the UE has a resource pool selected based on sensing (S-Pool) and a resource pool selected based on random selection (R-Pool), when the UE detects congestion in an S-Pool, the UE uses another non-congested S-Pool or an R-Pool. The congestion control above may also mean that if the UE chooses to select resources in an S-Pool, or the UE only configures one S-Pool, when the UE detects congestion on this S-Pool, the UE randomly selects resources on this S-Pool.

Based on the process shown in FIG. 15, as shown in FIG. 17, the locations that may be used to sense the congestion state of the system may include anchor points A~E. The congestion control function may be added only at one position of the above anchor points. Specifically, the process may be broken up at an anchor point in FIG. 17 and the congestion sensing function and the congestion control function shown in FIG. 18 or FIG. 19 are inserted in the anchor point in FIG. 17. Alternatively, the congestion control may be added at multiple anchor points.

As shown in FIG. 18, the UE detects a congestion state, and if a condition triggering the congestion control is satisfied, the UE may perform the congestion control to adjust transmission parameters. Wherein the adjusted parameters may be the parameters affecting the available resources collection $S_B$ obtained according to the SA and the received energy in FIG. 17. At this time, the UE may re-perform the process of resource reselection. For example, the parameters effecting the collection $S_B$ may be the number of sub-channels occupied by the data transmission and/or MCS. Or, as shown in FIG. 6, the UE detects a congestion state, and if a condition triggering the congestion control is satisfied, the UE performs the congestion control to adjust transmission parameters. Wherein, the adjusted parameters may be the parameters not affecting the available resources collection $S_B$ obtained according to the SA and the received energy in FIG. 17. At this time, the UE may continue to perform the current resource selection process. For example, the parameters not affecting the collection may be the transmission times and the transmission power of a group of data. The adjusted transmission parameters may immediately affect the ongoing resources reselection process, as shown in the method of FIG. 18 or FIG. 19. Or, it may only affect one or more processes of the resource reselection subsequently, as shown in FIG. 19. Assuming that congestion state of the system will be memorized, in the methods of FIG. 18 and FIG. 19, the process of adjusting the transmission parameters through the congestion control may include two cases: when the load level is relatively heavy, adjusting the transmission parameters by sacrificing certain transmission performances to exchange the stability of the system; and when the load level is relatively light, adjusting the transmission parameters, optimizing the transmission performances without affecting the system operation. Or, the UE may always assume that the system is not congested, then adjust the transmission parameters once sensing the congestion. Therefore, the method of adjusting the transmission parameters by the congestion control is that when the load level is relatively heavy, adjust the transmission parameters by sacrificing certain transmission performances to exchange the stability of the system.

In a condition triggering the congestion control is detected to be satisfied, the UE performs the congestion control to adjust the transmission parameters, which includes the number of sub-channels occupied for transmitting a certain amount of data, the modulation coding scheme (MCS), the times of transmission and the transmission power of a group of data etc. According to the current priority of the data transmitted by the UE, the process of adjusting the transmission parameters may refer to only adjusting the transmission parameters of the data with the current priority; or, only adjusting the transmission parameters of the data with the current priority or a lower priority; or, modifying the transmission parameters of the data with all priorities. If the UE may adopt different for the current data transmission, the UE may only adjust the transmission parameters with the priority of the data to be transmitted; or, the UE may also adjust the transmission parameters of the data with all possible priorities that may be adopted by the UE for the current data transmission.

Step 1602: according to the resources selected in step 1601, the UE transmits the SA to indicate resources of the data channels, and transmits the data accordingly.

The method for triggering the congestion control of the present disclosure is illustrated in the following embodiments.

Embodiment One

The congestion control function may be an independent module. When the metric of congestion reaches a certain level, the congestion control is triggered. The metric may be defined taking a resource as a unit, and the number of sub-channels contained by the resource equals to the number of sub-channels of the resource needed to be reserved currently.

For the resource reselection based on sensing, there are two mechanisms to determine whether a resource is available. In the first method, the resources are processed based on the SA and the received power. That is, the UE receives the SA correctly from other device B within a sensing window, and then the UE measures the received power of the device B according to scheduling information of the SA. When the received power is greater than a threshold Th1_R, the corresponding resource is not available. For a device B, it is assumed that the device B reserves resource Y subsequent to subframe n, wherein Y may contain one or more contiguous subbands, and the reference value $P_{RSRP}^{PSSCH}$ of the received power of resource Y exceeds the corresponding threshold Th1_R. $R_{x,y}$ represents a single subframe resource within a selection window [n+$T_1$, n+$T_2$], $R_{x,y}$ locates in subframe y and contains one or more consecutive subbands began from subband X. When the PRBs of $R_{x,y+j\cdot P_4}$ are overlapped with the PRBs of resource Y, $R_{x,y}$ is not available for device A. j may be an integer which is greater than or equals to 0, or j may be an integer which is greater than or equals to 0 and is less than C, wherein, the C is the number of cycles that the UE currently need to reserve resources in accordance with the cycle $P_4$. The second method is to compare resources on the basis of the received energy, thereby certain proportion of the resource with relatively small received energy is reserved, and the used resources is selected from the resources randomly.

The metric of congestion may be defined only according to the received power, that is, as for each resource within a window, when the received power is greater than a corresponding threshold, the resource is not available. The metric of congestion may also be defined only according to the received energy, that is, as for each resource within a window, when the received energy is greater than a corresponding threshold, the resource is not available. Or, the metric of congestion may also be defined based on the combination of the received power and the received energy, that is, as for each resource within a window, if this resource is not available according to any one of the two mechanisms of the received power and the received energy, it is determined that the resource is not available. For example, it is assumed that S subframes is contained in a window, each subframe may be divided into N resources, and the number of unavailable resources in the S subframes is B, the metric above may be defined as B/(S·N). Or, based on the received power, the metric may be defined as the average of the received power on the unavailable resources. Correspondingly, based on the received energy, the metric may be defined as the average of the received energy on the unavailable resources.

The metric above may be calculated according to various resources within the sensing window. Or, the metric may be calculated according to various resources within a period of time T of sensing, wherein the length of T may be greater or less than the length of the sensing window. For example, for a resource, the received energy is the average of the received energies of one or more sub-channels contained by the resource. This resource is not available when the received energy is greater than the threshold Th2. The threshold Th2 is a predefined value, a high-layer configured value, or a dynamic adjustable value. In addition, the metric may be a long-term average, such as an slidding average of the metrics at each moment. For example, the proportion of the number of unavailable resources in each length T0 time interval is measured. The measured value of the i times is recorded as Ri, then the metric is updated to $L(i)=c \cdot L(i-1)+(1-c) \cdot R_i$, wherein, C is a high-layer configured value or a dynamic adjustable value, and $L(i-1)$ is metric obtained in the previous calculation.

The metric may be calculated from the resource within a selection window after the prediction subframe n. The length of the selection window is equal to the interval of reserving resources of device A multiplied by the number of cycles for reserving resources continuously; or the length of the selection window may be equal to the interval for reserving resources of device A; or the length of the selection window may be the minimum of the interval for reserving resources, such as 100 ms. Or, the selection window may be the selection window $[n+T_1, n+T_2]$. In addition, the metric may be a long-term average, for example, the metric may be defined as an slidding average of measured values at each moment. For example, the proportion of the number of unavailable resources and the number of total resources in the ith selection is recorded as Ri, then the metric is updated to $L(i)=c \cdot L(i-1)+(1-c) \cdot R_i$, wherein C is a high-layer configured value, or a dynamic adjustable value, and $L(i-1)$ is the metric obtained in the previous calculation.

The process of calculation the ratio of the number of unavailable resources and the number of total resources within the selection window may be performed only when the resource reselection is needed. Or the process may be performed periodically. Based on the received power, as for a resource within the selection window, during the calculation of the metric above, it is considered to be unavailable when its' received power is greater than the threshold Th1. The threshold Th1 is the same as the threshold Th1_R used in the process of resource occupying of other devices subsequent to subframe n based on the SA. Or the threshold Th1 may be different from Th1_R. Th1 is a predefined value, a value configured by a higher layer, or a dynamic adjustable value. Or, Th1=Th1_R+Δ, Δ is a predefined value, a value configured by a higher layer, or a dynamic adjustable value. Based on the received energy, as for a resource, the received energy is the average of the received energies of one or more sub-channels that it contains, and this resource is not available when the received energy is greater than the threshold Th2. The threshold Th2 is a predefined value, a value configured by a higher layer, or a dynamic adjustable value.

When the metric exceeds a certain threshold, the congestion control may be triggered. After performing the congestion control to modify the transmission parameters, the UE may perform the resource reselection process.

Embodiment Two

The congestion control function may be performed after excluding the resource according to the SA and the received power. For example, based on the flow of FIG. 17, after step 1702, the congestion control function may be performed, that is, the congestion control is performed at anchor point A. Specifically, after excluding the resource based on the SA and the received power, the congestion sensing is performed before detecting whether the proportion of remaining resources is less than R, and the congestion control is performed in the event of congestion.

For the remaining resources of $S_A$, the metric of congestion a1 may be the maximum value of the received powers of the remaining resources of $S_A$, the average of the received powers of the remaining resources of $S_A$, or the proportion that the received power of the remaining resources of $S_A$ is greater than a threshold Ta0, wherein, Ta0 may be a predefined constant, a configured or preconfigured value. For example, when the metric a1 exceeds the threshold Ta1, the congestion control is triggered. Ta1 may be a predefined constant, a configured or preconfigured value. Further, the case that the metric a1 exceeds the threshold Ta1 may be counted to obtain a metric a2. For example, when the metric a2 is greater than a certain threshold Ta2, the congestion control is triggered. The metric a2 may be the result of counting the case where the metric a1 exceeds the threshold Ta1. Ta2 may be a predefined constant, a configured or preconfigured value. When the resource reselection or a congestion control is started, it can be re-counted from 0. And when the proportion above is greater than the threshold Ta2, the congestion control is triggered again. N can be a predefined constant, a configured or preconfigured value.

The metric of congestion a3 may be the proportion of the remaining resources of $S_A$. For example, when the metric a3 is smaller than a threshold Ta3, the congestion control is triggered. Ta3 may be a predefined constant, a configured or preconfigured value. Ta3 may be greater than R, equals to R or be less than R. Further, the case that the metric a3 is less than the threshold Ta1 may be counted to obtain a metric a4. For example, when the metric a4 is greater than a certain threshold Ta4, the congestion control is triggered. The metric a4 may be the result of counting the case where the metric a3 is less than the threshold Ta3. Ta4 may be a predefined constant, a configured or preconfigured value. When the resource reselection or a congestion control is started, it can be re-counted from 0. And when the metric a4 is greater than the threshold Ta4, the congestion control is triggered again.

When the UE has multiple resource pools, the UE may select a non-congested resource pool as much as possible when the UE detects congestion based on the metrics a1, a2, a3, or a4; or the UE may select a resource pool with a lower load level; or, when multiple resource pools are congested, a resource pool with a lower load level may be selected; or, when multiple resource pools are congested, the UE may randomly select a resource pool. Alternatively, assuming that the UE has both S-Pool and R-Pool, the UE uses other non-congested S-Pool or R-Pools when the UE detects congestion in an S-Pool based on the metrics a1, a2, a3, or a4 described above. Assuming that the UE chooses to select a resource on an S-Pool or the UE only configures an S-Pool, according to the metrics a1, a2, a3 or a4, when the UE detects congestion on the S-Pool, the UE may randomly select resources for data transmission on the current set of remaining resources of $S_A$. For the metric a1 or a3, the set of the current remaining resources of $S_A$ includes the resources in which the received power does not exceed the corresponding threshold in step 1702 of FIG. 17. For the metric a2 or a4, the set of the current remaining resources of $S_A$ is the collection of resources of which the received resource do not exceed the corresponding threshold, after the step 1702 is performed in last time.

In the working process of a V2X system, in order to measure the load, the channel busy ratio (CBR) can also be introduced. The ratio of the number of subchannels of which the received energy (S-RSSI) exceeds a certain threshold in an observation window to the total number of subchannels in the observation window recorded as cbr. For example, the observation window is 100 ms. The cbr measured in an observation window may be used directly as a CBR for handling the congestion control. Or, the cbr measured in an observation window may be processed at a high layer, for example, the processing result of averaging, weighted averaging or overlapping averaging of the multiple measured values of cbr is used as CBR for handling the congestion control. When the CBR exceeds the corresponding threshold, the UE performs the congestion control.

In case that the UE has multiple resource pools, when the UE detects congestion based on the CBR, the UE selects a non-congested resource pool as much as possible; or the UE selects a resource pool with a lower load level. Or, when multiple resource pools are congested, a resource pool with a lower load level is selected. Or, when multiple resource pools are congested, the UE may randomly select the resource pool. Alternatively, assuming that the UE has both S-Pool and R-Pool, the UE uses other non-congested S-Pool or R-Pools when the UE detects congestion on an S-Pool based on the CBR. Assuming that the UE chooses to select a resource on an S-Pool or the UE only configures an S-Pool, according to the metrics a1, a2, a3 or a4, when the UE detects congestion on the S-Pool, the UE may use the R-Pool if the R-Pool is configured; or, the UE may randomly select resources for data transmission on the current set of remaining resources of $S_A$. For the metric a1 or a3, the set of the current remaining resources of $S_A$ includes the resources in which the received power does not exceed the corresponding threshold in step 1702 of FIG. 17. For the metric a2 or a4, the set of the current remaining resources of $S_A$ is the collection of resources of which the received resource do not exceed the corresponding threshold, after the step 1702 is performed in last time.

Embodiment Three

The congestion control function may be performed when the resource is excluded based on the SA and the received power and the remaining resource ratio is less than R. For example, based on the flow of FIG. 4, when step 1703 is performed and the remaining resource ratio is less than R, the congestion control function may be performed at anchor point B. After the resource is excluded according to the SA and the received power and the remaining resource ratio is less than R, the congestion is detected, and the congestion control is performed when the congestion occurs.

The congestion control may be triggered when the remaining resource ratio is less than R (referred to as metric b0). Alternatively, metric b1 may be obtained by counting the cases when the remaining resource ratio is less than R. For example, when metric b1 is greater than a threshold Tb1, the congestion control is triggered. Metric b1 may be a counted result of the cases when the remaining resource ratio is less than R. When a resource reselection or a congestion control is started, it may be re-counted from 0, and when metric b1 is greater than the threshold Tb1, the congestion control is triggered again. Tb1 may be a predefined constant, a configured or preconfigured value.

The congestion metric b2 may be the proportion of the remaining resources. For example, when metric b2 is less than a threshold Tb2, the congestion control is triggered. Tb2 may be a predefined constant, a configured or preconfigured value, and Tb2 is less than R. Further, metric b3 may be obtained by counting the cases when metric b2 is less than the threshold Tb2. For example, when metric b3 is greater than a threshold Tb3, the congestion control is triggered. Metric b3 may be a counted result of the cases when the metric b2 is less than the threshold Tb2. When a resource reselection or a congestion control is started, it may be re-counted from 0, and when metric b3 is greater than the threshold Tb3, the congestion control is triggered again.

When the UE has multiple resource pools, the UE selects a non-congested resource pool as much as possible when the UE detects congestion based on the metric b0, b1, b2, or b3; or the UE selects a resource pool with a lower load level; or when multiple resource pools are congested, a resource pool with a lower load level may be selected; or when multiple resource pools are congested, the UE randomly selects the resource pool. Alternatively, assuming that the UE has both S-Pools and R-Pools at the same time, the UE uses other non-congested S-Pools or R-Pools when the UE detects congestion on an S-Pool based on the metric b0, b1, b2, or b3 described above. Assuming that the UE chooses to select a resource in an S-Pool or the UE only configures an S-Pool, according to the metric b0, b1, b2, or b3, when the UE detects congestion on the S-Pool, the UE may randomly select resources for data transmission on the current set of remaining resources of $S_A$. For the metric b0 or b2, the set of the current remaining resources of $S_A$ includes the resources in which the received power does not exceed the corresponding threshold in step 1702 of FIG. 4. For the metric b1 or b3, the set of the current remaining resources of $S_A$ is the collection of resources of which the received resource do not exceed the corresponding threshold, after the step 1702 is performed in last time.

In the operations of the V2X system, in order to measure the load, channel busy ratio (CBR) can also be introduced. The ratio of the number of subchannels of which received energy (S-RSSI) exceeds a certain threshold in the observation window to the total number of subchannels in an observation window is recorded as cbr. For example, the observation window is 100 ms. The cbr measured in an observation window may be used directly as a CBR for handling congestion control; or the cbr measured in an observation window may be processed at a high layer, for example, averaging, weighted averaging or overlapping averaging is conduct to the multiple measured value of cbr, of which the processing result is used as CBR for handling the congestion control. When the CBR exceeds a corresponding threshold, the UE performs the congestion control.

When the UE has multiple resource pools, the UE selects a non-congested resource pool as much as possible when the UE detects congestion based on the CBR; or the UE selects a resource pool with a lower load level; or when multiple resource pools are congested, a resource pool with a lower load level is selected; or when multiple resource pools are congested, the UE randomly selects the resource pool. Alternatively, assuming that the UE has both S-Pools and R-Pools, the UE uses other non-congested S-Pools or R-Pools when the UE detects congestion on an S-Pool based on the CBR. Assuming that the UE chooses to select a resource on an S-Pool or the UE only configures an S-Pool, according to the metric b0, b1, b2 or b3, when the UE detects congestion on the S-Pool, the UE may randomly select resources for data transmission on the current set of remaining resources of $S_A$. For the metric b0 or b2, the set of the current remaining resources of $S_A$ includes the resources of which the received power does not exceed the corresponding threshold in step 1702 of FIG. 4. For the metric b1 or b3, the set of the current remaining resources of $S_A$ is the collection of resources of which the received resource do not exceed the corresponding threshold, after the step 1702 is performed in last time.

Embodiment Four

The congestion control function may be performed when the resource is excluded based on the SA and the received power and the remaining resource ratio is not less than R. For example, based on the flow of FIG. 17, after determining the remaining resource ratio is not less than R in step 1703, the congestion control function is performed at anchor point C. The collection of the remaining resources of $S_A$ at this time is recorded as $S_{A2}$.

As for the resource of $S_{A2}$, metric c1 of the congestion may be the maximum value of the received energies of the resources in $S_{A2}$, the average of the received energies of the resource in $S_{A2}$, or the proportion that the received energy of the resource in $S_{A2}$ is greater than a threshold Tc0, wherein Tc0 may be a predefined constant, a configured or preconfigured value. The proportion that the received energy of the resource in $S_{A2}$ is greater than a threshold Tc0 may be a ratio of the number of resources that the received energy is greater than a threshold Tc0 in to the total number of resources in $S_{A2}$; or the proportion above may also be a ratio of the number of resources that the received energy is greater than a threshold Tc0 in to the total number of resources in $S_A$. For example, when metric c1 exceeds the threshold Tc1, the congestion control is triggered. Tc1 can be a predefined constant, a configured or preconfigured value. Further, metric c2 may be obtained by counting the cases when metric c1 exceeds the threshold Tc1. For example, the congestion control is triggered when metric c2 is greater than a certain threshold Tc2. The metric c2 may refer to the proportion of the case when metric c1 exceeds the threshold Tc1. After starting the V2X transmission or after a congestion control, the UE may count metric c2 again, and starting from the $N_{th}$ resource reselection, when the ratio is greater than the threshold Tc2, the congestion control is triggered again. N may be a predefined constant, a configured or pre-configured value. Tc2 may be a predefined constant, a configured or preconfigured value.

Or the congestion metric c3 may be the ratio of resources of $S_{A2}$ to $S_A$. For example, when metric c3 is less than a threshold Tc3, the congestion control is triggered. Tc3 may be a predefined constant, a configured or preconfigured value, Tc3 is greater than or equal to R. Further, metric c3 may be obtained by counting the cases where the metric c3 is less than the threshold Tc3. For example, when metric c4 is greater than a threshold Tc4, the congestion control is triggered. The metric c4 may be the proportion of the cases when metric c3 is less than the threshold Tc3. After starting the V2X transmission or after a congestion control, the UE may count the metric c4 again, and starting from the $N_{th}$ resource reselection. When the proportion is greater than the threshold Tc4, the congestion control is triggered again. N may be a predefined constant, a configured or preconfigured value. Tc4 may be a predefined constant, a configured or preconfigured value.

Embodiment Five

The congestion control function may be performed after obtaining a set of available resources based on the SA and the received energy. For example, based on the flow of FIG. 4, the congestion control function is performed at anchor point D.

As for the resource $S_B$, the congestion metric d1 may be the maximum value of the received energies of the resources in $S_B$, the average of the received energies of the resources in $S_B$, or the proportion that received energies of the resources in $S_B$ is greater than a threshold Td0, wherein Td0 may be a predefined constant, a configured or preconfigured value. For example, when metric d1 exceeds a threshold Td1, the congestion control is triggered. Td1 may be a predefined constant, a configured or pre-configured value. Further, metric d2 may be obtained by counting the cases when the metric d1 exceeds the threshold Td1. For example, when metric d2 is greater than a threshold Td2, the congestion control is triggered. The metric d2 may be the proportion of the cases when metric d1 exceeds the threshold Td1. After starting the V2X transmission or after a congestion control, the UE may count the metric d2 again, and starting from the $N_{th}$ resource reselection. When the proportion is greater than the threshold Td2, the congestion control is triggered again. N may be a predefined constant, a configured or preconfigured value. Td2 may be a predefined constant, a configured or preconfigured value.

Embodiment Six

The congestion control function may be performed after completing the resource reselection. For example, based on the flow of FIG. 4, the congestion control function is performed at anchor point E. According to the system configuration, the UE may select K resources for data transmission, for example, K is equal to 1 or 2.

For the selected K resources, the congestion metric e1 may be the maximum value of the received energies of the K resources or the average value of the received energies of the K resources. If K is equal to 1, the received energy of selected resource is the metric e1. For example, when the metric e1 exceeds the threshold Te1, the congestion control is triggered. Te1 can be a predefined constant, a configured or preconfigured value. Further, the metric e2 may be obtained by counting the cases where the metric e1 exceeds the threshold Te1. For example, when the metric e2 is greater than a threshold Te2, the congestion control is triggered. The metric e2 may be the proportion of the cases when the metric e1 exceeds the threshold Te1. After starting the V2X transmission or after a congestion control, the UE may count the metric e2 again, and starting from the $N_{th}$ resource reselection. When the proportion is greater than the threshold Te2, the congestion control is triggered again. N may be a predefined constant, a configured or preconfigured value. Te2 may be a predefined constant, a configured or preconfigured value.

Alternatively, due to the restriction of availability resources, the number of available resources may be selected is less than K when the UE performs resource reselection. For example, there is only one available resource. Further, the UE may obtain the metric e3 by counting the cases where the number of available resources is less than K after the resource reselection. For example, when the metric e3 is greater than a threshold Te3, the congestion control is triggered. The metric e3 may be the proportion of the cases where only one resource is selected in the resource reselection. After starting the V2X transmission or after a congestion control, the UE may count the proportion again, and starting from the Nth resource reselection, when the proportion is greater than the threshold Te3, the congestion control is triggered again. N may be a predefined constant, configured or preconfigured value. Te3 may be a predefined constant, configured or preconfigured value.

Embodiment Seven

On a carrier, the UE may be configured or preconfigured with multiple resource pools, and accordingly, the data of the UE may be transmitted within the multiple resource pools. For UEs that support V2X communication on multiple carriers. The multiple carriers support the UE transmitting on multiple carriers at the same time; or alternatively, support the UE switching to different carriers at different times. So the transmission on multiple carriers can be achieved. For example, subframes of resource pools for multiple carriers of the UE are time division. The common point of the two cases above is that the UE has multiple resource pools that are available for data transmission.

According to the method of FIG. 17, step 1703 makes the proportion of the remaining resources of the resource set be not less than R. When the UE is configured with Np resource pools, the parameter R of each resource pool may be determined separately. The ratio R may be predefined. The ratio R of the Np resource pools may be the same, or it may be configured or pre-configured for each resource pool. Alternatively, the Np resource pools of the UE are as a whole. That is, as a larger resource pool to process resource reselection, thus only a ratio R is determined. The ratio R may be predefined, configured or preconfigured. The ratio R configured for the Np resource pools by the UE and the ratio R of performing resource reselection when the UE only configures one resource pool may be the same or different.

The first method is to perform resource reselection for the Np resource pools of the UE. As shown in FIG. 20, the resource reselection is performed for each resource pool according to the method of FIG. 4, and when the congestion occurs on a resource pool, the UE may simply adjust the transmission parameters (2001) of the resource pool, or the UE may also adjust the transmission parameters of all the Np resource pools at the same time. In this way, the UE selects resources in the multiple resource pools. Next, the UE may select the actually occupied resources (2002) according to a certain priority policy. For example, the UE may randomly select a resource pool and transmit on the selected resource of the resource pool; or the UE preferentially selects the resource of resource pool that does not occur congestion; or the UE preferentially selects resource of the resource pool with a relatively small metric; or the UE preferentially selects the resource of a resource pool and maximizes the number of PRBs that may be used for data transmission; or as for the multiple candidate resources, the UE selects the resource with lowest received power and/or the lowest received energy of the other UEs; or according to the information such as the congestion status of each resource pool, weight for each resource pool is generated and the resources of one of the Np resource pools is selected randomly according to the weight.

The second method is to perform the operation of excluding resource according to the SA and the received power separately for the Np resource pools of the UE, but the Np resource pools of the UE are as a whole, that is, as a larger resource pool to perform processing of resource reselection according to the received energy. For example, based on the flow of FIG. 4, steps 1701 to 1704 may be performed for each resource pool separately, and steps 1705 to 1707 are performed jointly on each resource pool when each resource pool gets a remaining resource which is not less than the proportion R. In the case of processing resources according to received energy, it is not suitable to compare the received energies of the resources of the respective carriers directly because the characteristics of the respective carriers are different. Record that the received energy of a resource on the carrier k is $E_k$, a received energy offset $o_k$ may be configured for the carrier, so as to remove the resources with larger $E_k+o_k$ by comparing the $E_k+o_k$ of respective resources of the respective carriers. The offset $o_k$ may be configured by a high-layer signaling. Assuming that K resources are to be selected for a data, in step 1706, it is possible to select up to K resources on the same resource pool, or, it is not limited to select multiple resources that are located only in the same r pool. resource When congestion is detected on the larger resource pool consisting of Np resource pools, the UE may further determine the resource pool that occurs congestion actually. Assuming that congestion is detected on a resource pool based on the received power, the UE may simply adjust the transmission parameters of the resource pool or adjust the transmission parameters of the Np resource pools. Assuming that congestion is detected based on the received energy, the transmission parameters of the Np resource pools may be adjusted, or the transmission parameters of the resource pool that occurs congestion actually may be adjusted. In this way, for a resource pool in which congestion is detected, there is still the remaining resources amount to the proportion R of the resource pool to transmit to step 1705. When the total number of remaining resources that the Np resource pools input to step 1705 is close to the ratio R of the total number of resources of the Np resource pools, the resources with larger received energy that can be removed in step 1705 are limited, which causes the resource selected randomly in step 1706 may come from a resource pool that has been congested.

The third method takes the Np resource pools of the UE as a whole, that is, as a larger resource pool to handle resource reselection. For example, in the larger resource pool, the resource reselection is handled according to the method of FIG. 4. The resource collection $S_A$ in step 1701 of FIG. 17 is determined according to the total number of resources of the Np resource pools in the selection window; in step 1702, as for the Np resource pools, the resources are excluded according to the received power; in step 1703, if the total number of remaining resources of the Np resource pools is less than the proportion R of the set $S_A$, the respective thresholds of the Np resource pools are increased in step 1704, for example, by 3 dB; in step 1705, as for the remaining resources of $S_A$, the ratio of the resource of the collection $S_B$ is not less than R by processing the received energy. For the case of processing resources based on received power, the thresholds for excluding the resources in step 1702 may be configured separately for each resource pool; or, alternatively, the larger resource pool consisted of the Np resource pools is configured a threshold, so that the configured threshold applies to each resource pool. For the method of configuring a threshold for the larger resource pool, it is not be suitable for directly comparing the received power of resource of a carrier with the threshold, because the characteristics of each carrier are different and. Record that the received power of a resource on the carrier k is $P_k$, a received power offset $o_k^P$ may be configured for the carrier, so as to remove the resources with larger $P_k+o_k^P$ by comparing the $P_k+o_k^P$ of respective resources of the respective carriers. The offset $o_k^P$ may be configured by a high-layer signaling. As for the case of processing resources based on received energy, it is not suitable to directly compare the received energies of the resources of the respective carriers because the characteristics of the respective carriers are different. Record that the received energy of a resource on the carrier k is $E_k$, a received energy offset $o_k^E$ may be configured for the carrier, so as to remove the resources with larger $E_k+o_k^E$ by comparing the $E_k+o_k^E$ of respective resources of the respective carriers. The offset $o_k^E$ may be configured by a high-layer signaling. In this method, after the steps 1702 to 1704, the remaining resources of the congested resource pools are small, and the remaining resources of the uncongested resource pools are large; after steps 1705 and 1706, the probability of selecting the remaining resources of the uncongested resource pools are greater, so load balancing function may be achieved. Congestion control may still be handled separately for each resource pool, or it may also take Np resource pools as a whole to handle congestion. When congestion is detected on the larger resource pool consisted of the Np resource pools, the UE may further determine the resource pool that occurs congestion actually. Assuming that congestion is detected on the larger resource pool based on the received power, the UE may simply adjust the transmission parameters of the Np resource pools, or, may adjust the transmission parameters of the resource pool that occurs congestion actually; assuming that congestion is detected based on the received energy, the transmission parameters of the Np resource pools may be adjusted, or the transmission parameters of the resource pool that occurs congestion actually may be adjusted. Assuming that K resources are to be selected for a data, in step 1706, it is possible to select up to K resources on the same resource pool, or, it is not limited to select multiple resources that are located only in the same resource pool.

Assume that the UE configures with resource pools on the Nc carriers and the resource used for transmission is selected over the Nc resource pools, when the resource reselection is performed, if the uplink transmission of the cellular network has been scheduled on a subframe of a carrier, the UE may remove the resource of the subframe occupied by the uplink transmission of the cellular network from the alternative resources. Alternatively, the UE may re-perform resource reselection after discovering the conflict of the selected resource and the uplink transmission of the cellular network. Using this method, the conflict of uplink transmission of the cellular network and V2X transmission is avoid as far as possible.

As for the case that the UE may be configured Np resource pools, in order to ensure that the data transmission of a UE may reach all the other UEs in the vicinity of the UE, it is required that all of the other UEs preform reception operation in the Np resource pools. In general, the configuration of Np resource pools for all UEs is common in one area. The Np resource pools may be predefined, configured or pre-configured by a high-layer signaling.

In addition, assuming that the UE configures with Na resource pools, it is not possible that any data all may be mapped to any of the Na resource pools to transmit. When configuring a resource pool for a UE, it may indicate the data type used by a resource pool. A UE may configure with one or more data types, one data type may configure one or more resource pools, and a resource pool may support one or more data types. The data types may be distinguished by priority; or they may be distinguished by business characteristics, for example, periodic quasi cycle services and event-triggered services. The data types of the resource pools may be predefined, configured or pre-configured by a high-layer signaling. Alternatively, when configuring a resource pool of a UE, it is also possible to further configure a sharing relationship between resource pools. For example, a set of resource pools is indicated by the sharing relationship, when transmitting a data, the UE may select resources for transmission and the data among the set of resource pools. The sharing relationships may be predefined, configured or pre-configured a high-layer signaling. In a region, the configuration of resource pool of the different UEs should be consistent; so as to ensure the receiving UE does not miss the data of the transmitting UE.

In accordance with the methods above, the present application also discloses a device which may be used to implement the methods above. As shown in FIG. 8, the device may include a detection module, a resource reselection module, a congestion control module and a transceiver module.

The detection module is to detect an SA from another device, to measure the received power of the another device, and the received energy on each subchannel of each subframe in a resource pool;

the resource reselection module is to select or reselect resources of the SA and data channels according to the detected received power of the another device or according to the combination of the detected received power of the another device and the received energy on each subchannel of each subframe in the resource pool;

the congestion control module is to detect the load level of the system and to perform congestion control when the load reaches a certain level;

the transceiver module is to receive SAs and data channels from other devices and to transmit the SA and data channels according to the selected/reselected channel resources.

Those skilled in the art may understand achieving all or a portion of the steps carried out by the method embodiments described above may be accomplished through commanding the associated hardware by a program, the program may be stored in a computer readable storage medium, when it is executed, one of the steps of the method embodiments or a combination thereof is included.

In addition, the functional units in the various embodiments of the present application may be integrated in a processing module, or each unit may be physically present individually, or two or more units may be integrated in one module. The integrated module may be implemented in the form of hardware, and may also be achieved in the form of software function modules. The integrated module may also be stored in a computer-readable storage medium if it is implemented in the form of a software function module and is sold or used as a standalone product.

The storage medium may be a read-only memory, a magnetic disk, or an optical disk.

The foregoing is only preferred embodiments of the present application and is not used to limit the protection scope of the present application. Any modification, equivalent substitution and improvement without departing from the spirit and principle of the present application are within the protection scope of the present application.

The foregoing is only preferred embodiments of the present disclosure, which is not for use in limiting the present disclosure. Any modifications, equivalent substitutions or improvements made within the spirit and principle of the present disclosure, should be covered by the protection scope of the present disclosure.

The invention claimed is:

1. A method performed by a terminal in a communication system, the method comprising:
receiving, from a base station, information on a plurality of transmission parameter sets for transmitting a sidelink data, wherein a first channel busy ratio (CBR) range is associated with a first range of a plurality of priorities of the sidelink data, and a first set of the plurality of the transmission parameter sets, wherein a second CBR range, different than the first CBR range, is associated with the first range of the plurality of priorities and a second set of the plurality of the transmission parameter sets, different than the first set, wherein a third CBR range is associated with a second range of a plurality of priorities, different than the first range of the plurality of priorities and a third set of the plurality of the transmission parameter sets, and wherein a fourth CBR range, different than the third CBR range, is associated with the second range of the plurality of priorities and a fourth set of the plurality of transmission parameter sets, respectively;

identifying a CBR and the priority of the sidelink data;

determining a transmission parameter set, among the plurality of transmission parameter sets, corresponding to a CBR range associated with the identified CBR, among the CBR ranges associated with the identified priority of the sidelink data;

transmitting a scheduling assignment (SA) corresponding to the sidelink data; and transmitting the sidelink data based on the determined transmission parameter set and the SA.

2. The method of claim 1, wherein each of the transmission parameter sets comprises modulation and coding scheme (MCS), a number of physical resource block (PRB), a number of data transmission and a maximum limit of channel occupancy ratio (CR).

3. The method of claim 1, further comprising identifying channel occupancy ratio (CR) indicating a ratio of a number of sub-channels occupied by the terminal to the total number of sub-channels within a time period.

4. The method of claim 3, wherein the CR is identified per priority of a data.

5. The method of claim 3, wherein the CR for subframe n is identified within a subframe [n−L1, n+L2], wherein L1 is a positive integer and L2 is 0 or a positive integer.

6. The method of claim 3, further comprising:

calculating a sum of CRs corresponding to data having a priority less than or equal to the priority of the sidelink data; and transmitting the sidelink data based on whether the sum of CRs is greater than a maximum limit of CR included in the determined transmission parameter set.

7. The method of claim 6, further comprising:

adjusting transmission of the sidelink data so that the sum of CRs is less than or equal to the maximum limit of CR included in the determined transmission parameter set, in case that the sum of CRs is greater than the maximum limit of CR included in the determined transmission parameter set.

8. The method of claim 1, further comprising selecting a number of retransmissions and an amount of frequency resources associated with the sidelink data.

9. A terminal in a communication system, the terminal comprising:

a transceiver; and a controller configured to:

receive, from a base station, information on a plurality of transmission parameter sets for transmitting a sidelink data, wherein a first channel busy ratio (CBR) range is associated with a first range of a plurality of priorities of the sidelink data, and a first set of the plurality of the transmission parameter sets, wherein a second CBR range, different than the first CBR range, is associated with the first range of the plurality of priorities and a second set of the plurality of the transmission parameter sets, different than the first set, wherein a third CBR range is associated with a second range of a plurality of priorities, different than the first range of the plurality of priorities and a third set of the plurality of the transmission parameter sets, and wherein a fourth CBR range, different than the third CBR range, is associated with the second range of the plurality of priorities and a fourth set of the plurality of transmission parameter sets, respectively;

identify a CBR and the priority of the sidelink data;

determine a transmission parameter set, among the plurality of transmission parameter sets, corresponding to a CBR range associated with the identified CBR, among the of CBR ranges associated with the identified priority of the sidelink data;

transmit a scheduling assignment (SA) corresponding to the sidelink data; and transmit the sidelink data based on the determined transmission parameter set and the SA.

10. The terminal of claim 9, wherein each of the transmission parameter sets comprises modulation and coding scheme (MCS), a number of physical resource block (PRB), a number of data transmission and a maximum limit of channel occupancy ratio (CR).

11. The terminal of claim 9, wherein the controller is further configured to identify a channel occupancy ratio (CR) indicating a ratio of a number of sub-channels occupied by the terminal to the total number of sub-channels within a time period.

12. The terminal of claim 11, wherein the CR is identified per priority of a data.

13. The terminal of claim 11, wherein the CR for subframe n is identified within a subframe [n−L1, n+L2], and wherein L1 is a positive integer and L2 is 0 or a positive integer.

14. The terminal of claim 11, wherein the controller is further configured to:

calculate a sum of CRs corresponding to data having a priority less than or equal to the priority of the sidelink data; and transmit the sidelink data based on whether the sum of CRs is greater than a maximum limit of CR included in the determined transmission parameter set.

15. The terminal of claim 14, wherein the controller is further configured to:

adjust transmission of the sidelink data so that the sum of CRs is less than or equal to the maximum limit of a CR included in the determined transmission parameter set, in case that the sum of CRs is greater than the maximum limit of the CR included in the determined transmission parameter set.

16. The terminal of claim 9, wherein the controller is further configured to select a number of retransmissions and an amount of frequency resources associated with the sidelink data.

* * * * *